(12) United States Patent
Yasuda

(10) Patent No.: US 9,160,901 B2
(45) Date of Patent: Oct. 13, 2015

(54) IMAGE PICKUP APPARATUS, LENS UNIT, AND METHODS OF CONTROLLING THE SAME

(71) Applicant: CANON KABUSHIKI KAISHA, Tokyo (JP)

(72) Inventor: Hitoshi Yasuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 13/729,873

(22) Filed: Dec. 28, 2012

(65) Prior Publication Data
US 2013/0182175 A1 Jul. 18, 2013

(30) Foreign Application Priority Data

Jan. 13, 2012 (JP) .................. 2012-004725
Jun. 5, 2012 (JP) .................. 2012-127915

(51) Int. Cl.
*H04N 5/225* (2006.01)
*H04N 5/232* (2006.01)
(Continued)

(52) U.S. Cl.
CPC ............. *H04N 5/225* (2013.01); *G03B 3/10* (2013.01); *G03B 7/006* (2013.01); *G03B 7/20* (2013.01); *G03B 17/14* (2013.01); *H04N 5/23209* (2013.01); *H04N 5/23212* (2013.01)

(58) Field of Classification Search
CPC ............ H04N 5/23209; H04N 5/2259; H04N 5/23283; H04N 5/2254; H04N 5/23296; H04N 5/23212; H04N 5/225
USPC .......... 348/208.11, 224.1, 240.9, 240.3, 335, 348/346, 360, 374, 211.1, 231.9, E7.07
See application file for complete search history.

(56) References Cited

U.S. PATENT DOCUMENTS 5,387,960 A * 2/1995 Hirasawa et al. ............. 396/135
5,608,457 A * 3/1997 Tohyama et al. ............. 348/335
(Continued)

FOREIGN PATENT DOCUMENTS

CN   1135275 A   11/1996
EP   2463698 A1   6/2012
(Continued)

OTHER PUBLICATIONS

European Search Report issued on Aug. 19, 2015, in the corresponding European Patent Application No. 12199646.6.

*Primary Examiner* — Hung Lam
(74) *Attorney, Agent, or Firm* — Cowan, Liebowitz & Latman, P.C.

(57) ABSTRACT

An image pickup apparatus detachably mounting a lens unit including a plurality of optical members includes an image pickup unit that accumulates charge in synchronization with a vertical synchronizing signal to generate an image signal, and a control unit that generates control information for each of the plurality of optical members of the mounted lens unit and communicates the control information with the lens unit in synchronization with the vertical synchronizing signal. The control unit is configured to perform a first communication in synchronization with the vertical synchronizing signal, and to perform a second communication, for controlling an optical member different to the optical before a next first communication that is performed in synchronization with a next vertical synchronizing signal. The first communication and the second communication are predetermined packet communications in which optical members to be controlled among the plurality of optical members are different from each other.

22 Claims, 15 Drawing Sheets

(51) Int. Cl.
*G03B 3/10* (2006.01)
*G03B 7/00* (2014.01)
*G03B 7/20* (2006.01)
*G03B 17/14* (2006.01)

(56) References Cited

U.S. PATENT DOCUMENTS

| | | | |
|---|---|---|---|
| 6,005,618 A | 12/1999 | Fukui et al. | |
| 6,034,726 A * | 3/2000 | Hirota et al. | 348/347 |
| 2005/0185083 A1 | 8/2005 | Okawara | |
| 2009/0244327 A1* | 10/2009 | Toguchi | 348/239 |
| 2009/0245778 A1 | 10/2009 | Shibuno et al. | |
| 2009/0256950 A1 | 10/2009 | Kawazoe et al. | |
| 2011/0149141 A1 | 6/2011 | Yasuda | |
| 2012/0189295 A1* | 7/2012 | Kato | 396/497 |

FOREIGN PATENT DOCUMENTS

| | | |
|---|---|---|
| JP | 02-210312 A | 8/1990 |
| JP | 03-247179 A | 11/1991 |
| JP | 11-125860 | 5/1999 |
| JP | 2004-325801 A | 11/2004 |
| JP | 2009-088897 A | 4/2009 |
| JP | 2011-215594 A | 10/2011 |
| JP | 2012-137739 | 7/2012 |

* cited by examiner

FIRST COMMUNICATION

| Word | LENS → CAMERA DATA | Word | CAMERA → LENS DATA |
|---|---|---|---|
| 0 | HEADER FIRST COMMUNICATION (LENS → CAMERA) | 0 | HEADER FIRST COMMUNICATION (CAMERA → LENS) |
| 1 | STOP POSITION | 1 | STOP TARGET POSITION |
| 2 |  | 2 | STOP DRIVE SPEED |
| 3 |  | 3 |  |
| 4 | FOCUS LENS POSITION | 4 |  |
| 5 | ZOOM FOCAL DISTANCE | 5 |  |
| 6 |  | 6 |  |
| 7 |  | 7 |  |
| 8 |  | 8 |  |
| ⋮ | ⋮ | ⋮ | ⋮ |
| m | CHECK SUM | m | CHECK SUM |

SECOND COMMUNICATION

| Word | LENS → CAMERA DATA | Word | CAMERA → LENS DATA |
|---|---|---|---|
| 0 | HEADER SECOND COMMUNICATION (LENS → CAMERA) | 0 | HEADER SECOND COMMUNICATION (CAMERA → LENS) |
| 1 |  | 1 | FOCUS TARGET POSITION |
| 2 |  | 2 | FOCUS DRIVE SPEED |
| 3 |  | 3 | DRIVE DELAY TIME PERIOD |
| 4 |  | 4 | DRIVING INSTRUCTION EFFECTIVE BIT |
| ⋮ | ⋮ | ⋮ | ⋮ |
| n | CHECK SUM | n | CHECK SUM |

FIG. 12

IMAGE PICKUP APPARATUS, LENS UNIT, AND METHODS OF CONTROLLING THE SAME

BACKGROUND OF THE INVENTION

1. Field of the Invention

The present invention relates to a lens unit, and an image pickup apparatus capable of mounting the lens unit.

2. Description of the Related Art

Recently, in methods of automatic focusing a camera, the most common method is of obtaining a TVAF evaluation value that represents the sharpness of an image from an image signal obtained by a photoelectrical conversion of an object. Focusing is performed by controlling a focus lens position so that the television auto-focus (TVAF) evaluation value peaks (hereinafter, TVAF method).

Generally, the TVAF evaluation value in the TVAF method is generated using a level of a high-frequency content of an image signal extracted by a band-pass filter. This is because, when a normal object is picked-up, the TVAF evaluation value increases as a focus lens comes close to an in-focus position. This is illustrated in FIG. 2, and the point where the level of the TVAF evaluation value peaks is the in-focus position for the object.

As a lens control of the TVAF method, there is an operation of detecting an in-focus direction based on a change of a TVAF evaluation value when a focus lens is minutely moved to back and forth between a close/infinity side as illustrated in FIG. 3 (hereinafter, reciprocating operation). Since the TVAF evaluation value is generated based on the image signal, it is necessary that the reciprocating operation is synchronized with a vertical synchronizing signal of an image pickup element.

Japanese patent Laid-Open No. H11-125860 describes that an interchangeable lens camera system in which a camera unit generates a TVAF evaluation value and transfers the TVAF evaluation value to a lens unit in communication, and in which the lens unit performs a TVAF control.

On the other hand, in case that the TVAF control is performed not in a lens unit as Japanese patent Laid-Open No. H11-125860 but in a camera unit, a driving instruction of the focus lens is generated based on the TVAF evaluation value in the camera unit, and the driving instruction is transmitted to the lens unit. In this case, when a single communication is performed in synchronization with the vertical synchronizing signal as Japanese patent Laid-Open No. H11-125860, it becomes like FIG. 4. In FIG. 4, in a single communication during one vertical synchronizing time period as before, information on a lens position is transmitted from the lens unit to the camera unit, and the driving instruction of the focus lens is transmitted from the camera unit to the lens unit. Accordingly, the camera unit performs an AF control based on focus lens position information obtained from the lens unit within the vertical synchronizing time period, and transmits the focus lens driving instruction in communication within the next vertical synchronizing time period. Therefore, it causes a problem because the focus lens driving instruction cannot be immediately transmitted based on the lens position information obtained from the lens unit thereby introducing a control cycle delay (responsiveness delay of AF). Further, in case of performing a control of a stop included in the lens unit on the basis of an instruction from the camera unit, the responsiveness of the auto-focus (AF) may deteriorate due to a load of an auto-exposure (AE) control for generating a stop control instruction.

SUMMARY OF THE INVENTION

The present invention provides an image pickup apparatus and a lens unit that enables an AF operation having a good responsiveness even when a TVAF control is performed on an image pickup apparatus side.

An image pickup apparatus as one aspect of the present invention detachably mounts a lens unit including a plurality of optical members, and includes an image pickup unit configured to accumulate charge in synchronization with a vertical synchronizing signal to generate an image signal, and a control unit configured to generate control information for each of the plurality of optical members of the mounted lens unit and configured to communicate the control information with the lens unit in synchronization with the vertical synchronizing signal. The control unit is configured to perform a first communication in synchronization with the vertical synchronizing signal, and to perform a second communication, for controlling an optical member different to the optical before a next first communication that is performed in synchronization with a next vertical synchronizing signal. The first communication and the second communication are predetermined packet communications in which optical members to be controlled among the plurality of optical members are different from each other.

A lens unit as another aspect of the present invention is detachably mounted on an image pickup apparatus including an image pickup unit that accumulates a charge in synchronization with a vertical synchronizing signal to generate an image pickup signal, and includes a plurality of optical members, and a lens control unit configured to communicate with an image pickup apparatus to which the lens unit is mounted and to control a drive of the plurality of optical members on the basis of information received from the image pickup apparatus. The lens control unit is capable of communicating with the image pickup apparatus in synchronization with a vertical synchronizing signal received from the image pickup apparatus. The lens control unit performs a first communication in synchronization with the vertical synchronizing signal, and then performs a second communication before a next first communication that is performed in synchronization with a next vertical synchronizing signal. The first communication and the second communication are predetermined packet communications in which optical members to be controlled among the plurality of optical members are different from each other.

A lens unit as another aspect of the present invention is detachably mounted on an image pickup apparatus including an image pickup unit that accumulates a charge in synchronization with a vertical synchronizing signal to generate an image signal, and includes a plurality of optical members including a focus lens, and a lens control unit configured to communicate with an image pickup apparatus to which the lens unit is mounted and to control a drive of the plurality of optical members on the basis of information received from the image pickup apparatus. The lens control unit is capable of communicating with the image pickup apparatus in synchronization with a vertical synchronizing signal received from the image pickup apparatus. The lens control unit performs a first communication in synchronization with the vertical synchronizing signal, and then performs a second communication before a next first communication that is performed in synchronization with a next vertical synchronizing signal. The lens control unit controls a drive of the focus lens on the basis of information received in the second communication, and controls a drive an optical member other than the focus lens on the basis of information received in the first communication.

A lens unit as another aspect of the present invention is detachably mounted on an image pickup apparatus including an image pickup unit that accumulates charge in synchronization with a vertical synchronizing signal to generate an image pickup signal, and includes a plurality of optical members including a stop and a focus lens, and a lens control unit configured to communicate with an image pickup apparatus to which the lens unit is mounted and to control a drive of the plurality of optical members on the basis of information received from the image pickup apparatus. The lens control unit is capable of communicating with the image pickup apparatus in synchronization with a vertical synchronizing signal received from the image pickup apparatus. The lens control unit performs a first communication in synchronization with the vertical synchronizing signal, and then performs a second communication before a next first communication that is performed in synchronization with a next vertical synchronizing signal. The lens control unit controls a drive of the focus lens on the basis of information received in the second communication, and controls a drive of the stop on the basis of information received in the next first communication.

Further features of the present invention will become apparent from the following description of exemplary embodiments with reference to the attached drawings.

BRIEF DESCRIPTION OF THE DRAWINGS

FIG. 12 illustrates content of communication data in embodiment of the present invention.

DESCRIPTION OF THE EMBODIMENTS

Figure 1:
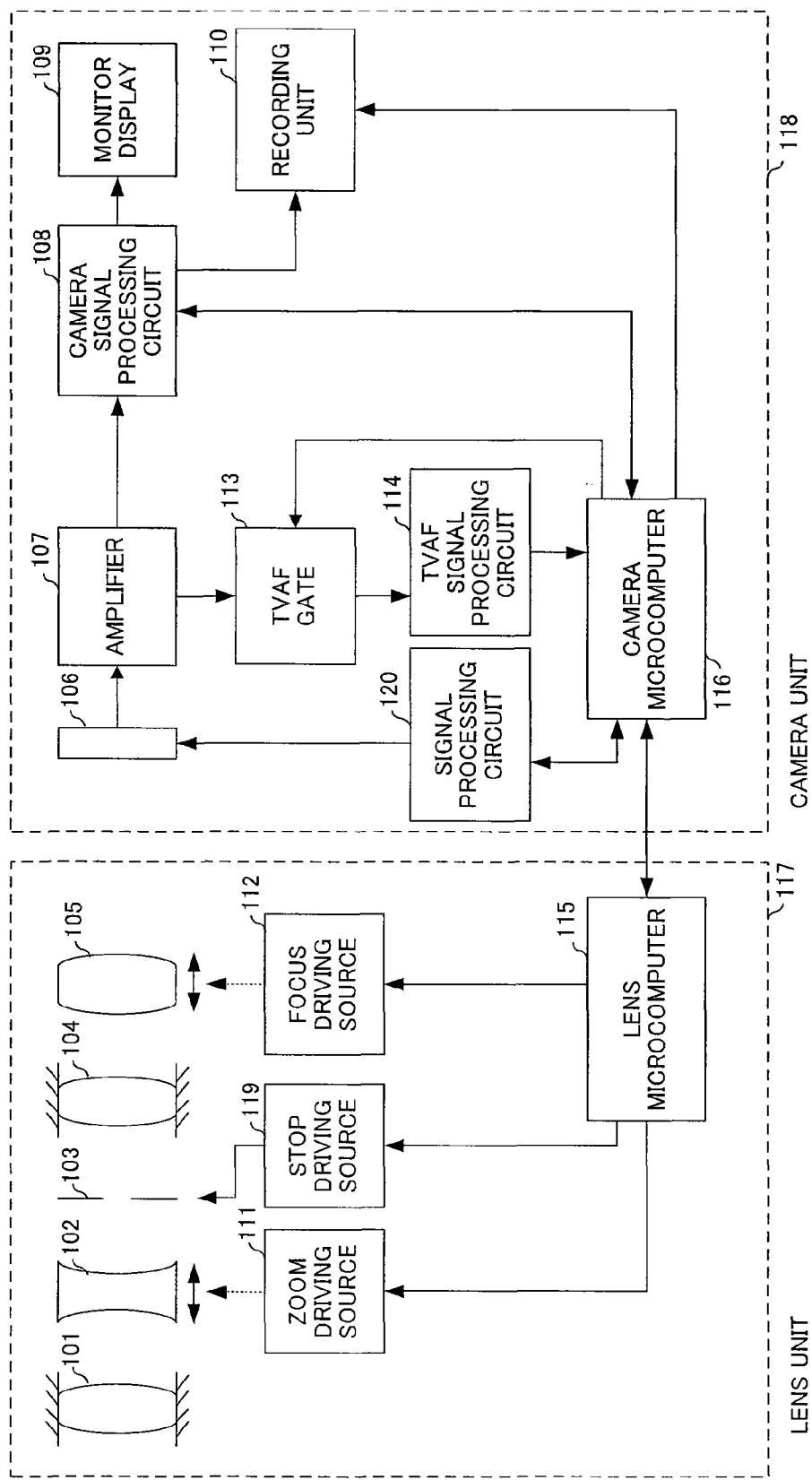
FIG. 1 is a diagram for explaining a configuration of a lens unit and a camera unit in embodiment of the present invention.

Exemplary embodiments of the present invention will hereinafter be described with reference to the accompanying drawings. FIG. 1 illustrates a configuration of a camera system in an embodiment of the present invention.

In FIG. 1, a lens unit 117 (hereinafter also referred to as "lens") that is an accessory is configured to be capable of being put on and taken off from a camera unit 118 (hereinafter also referred to "camera" or "image pickup apparatus") via a mount (not illustrated). The camera unit 118 can be mounted with the lens unit 117. The lens unit 117 and camera unit 118 forms a so-called interchangeable lens system.

In FIG. 1, the lens unit 117 includes an image pickup optical system 101 to 105 thereinside. In this embodiment, a first lens unit 101 and a third lens unit 104 are fixed. A second lens unit 102 is a lens unit for varying a magnification (hereinafter referred to as "magnification-varying lens"). An stop 103 adjusts the amount of incident light to an image pickup element 106. A fourth lens unit 105 is a lens unit that has both a focusing function and a compensation function of correcting a movement of a focus plane due to magnification-varying (hereinafter referred to as "focus lens"). The above-mentioned configuration of the image pickup optical system in the lens unit 117 is an example, and the invention is not limited to the configuration. Light from an object passes through the image pickup optical system 101 to 105 and forms an image on the image pickup element 106 consisting of a CMOS sensor and the like in the camera unit 118.

The image pickup element 106 in the camera unit 118 is a photoelectrical conversion element that is formed by a CMOS sensor or the like. The image pickup element 106 generates an image signal by a photoelectrical conversion of an object image, and the image signal is input to a camera signal processing circuit 108 after the image signal is amplified to an optimal level by an amplifier 107.

The camera signal processing circuit 108 provides various types of image processings for output signals from the amplifier 107, and generates an image. Further, the camera signal processing circuit 108 generates a value of an integral of a brightness signal of the image signal as AE evaluation value. The AE evaluation value is output to a camera microcomputer 116. A monitor display 109 is formed by a LCD or the like, and displays the image from the camera signal processing circuit 108. A recording unit 110 records the image from the camera signal processing circuit 108 to a storage medium, such as a semiconductor memory.

Figure 2:
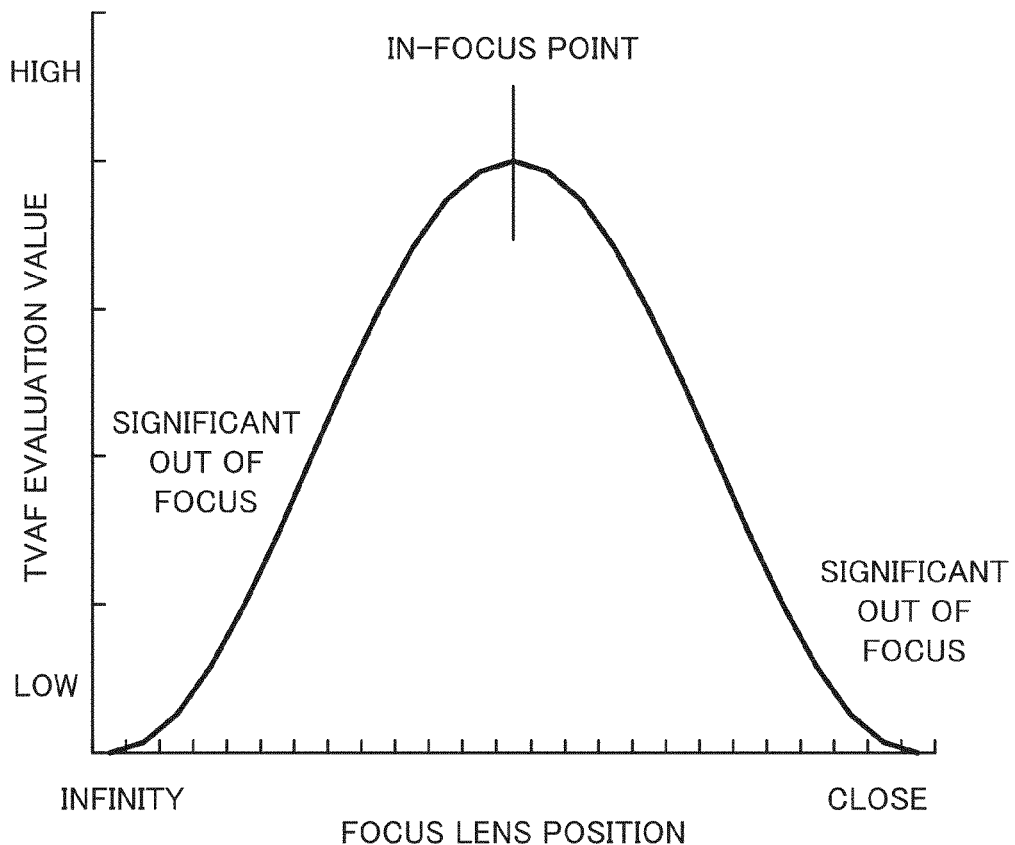
FIG. 2 is a diagram for explaining a relationship between a TVAF evaluation value and a focus lens position.
Figure 3:
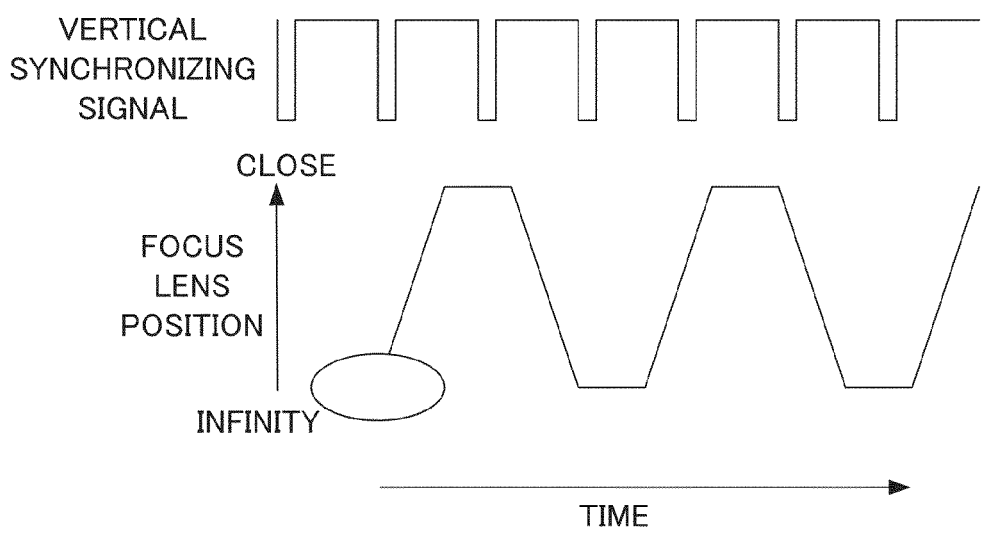
FIG. 3 is a diagram for explaining reciprocating operation of a TVAF control.
Figure 4:
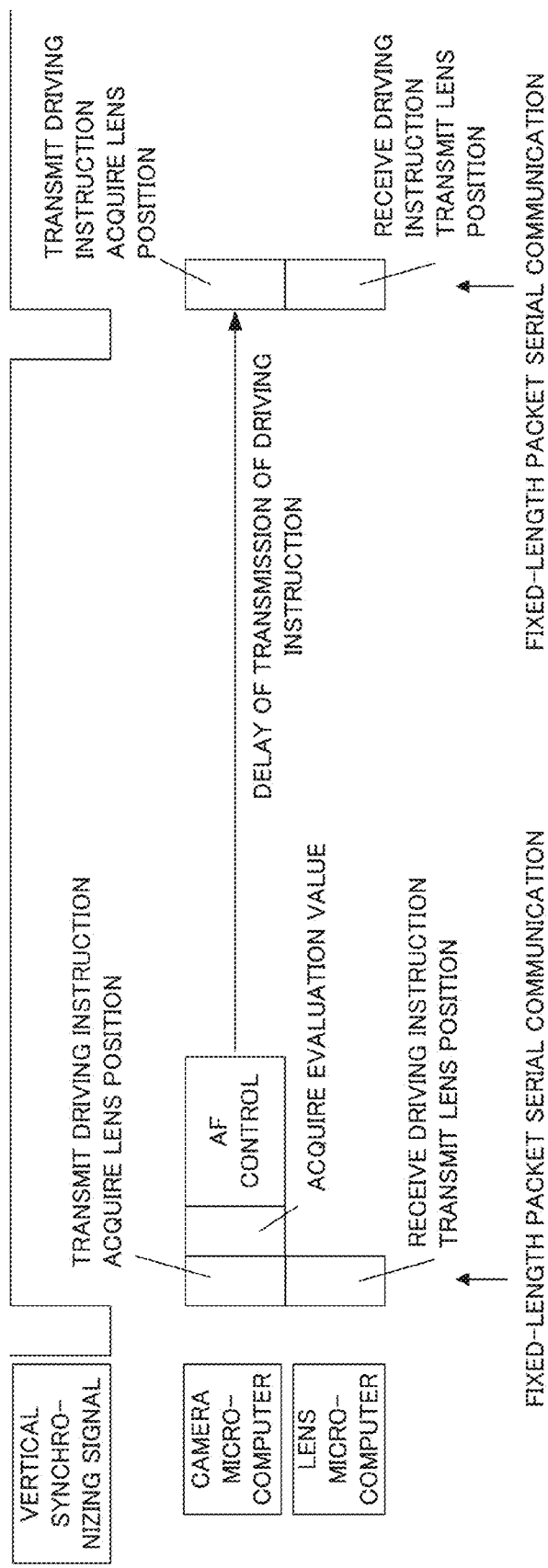
FIG. 4 is a diagram for explaining a control delay in a traditional communication between the lens unit and the camera unit.

A TVAF gate 113 permits the passage of only signals of areas used for focus detection among output signals from the amplifier 107 in all pixels. The TVAF signal processing circuit 114 generates a TVAF evaluation value by extracting high-frequency components from a signal that has passed through the TVAF gate 113. The TVAF evaluation value is output to the camera microcomputer 116. The TVAF evaluation value represents the sharpness (contrast state) of a picked-up image generated based on an image signal from the image pickup element 106, and as a result, is used as a signal representing a focus state of the image pickup optical system as illustrated in FIG. 2 because the sharpness varies according to the focus state of the image pickup optical system.

The camera microcomputer 116 as a controller controls an operation in a whole camera, and controls the TVAF gate 113 so as to set a TVAF frame at a predetermined rate to the image.

The camera microcomputer 116 performs a TVAF control based on the TVAF evaluation value obtained from the TVAF signal processing circuit 114, and transmits a desired driving instruction of the focus lens to the lens microcomputer 115. Further, the camera microcomputer 116 performs an AE control based on the AE evaluation value obtained from the camera signal processing circuit 108, and transmits a desired driving instruction of the stop to the lens microcomputer 115. As above, the camera microcomputer 116 and the lens microcomputer 115 are formed so as to be capable of communicating with each other.

A zoom driving source 111 in the lens unit 117 is a driving source for driving the magnification-varying lens 102. A focus driving source 112 is a driving source for driving the focus lens 105, which is a first optical member. The zoom driving source 111 and the focus driving source 112 are formed by an actuator, such as a stepping motor, a DC motor, a vibration motor, and a voice coil motor. Further, a stop driving source 119 in the lens unit 117 is a driving source for driving the stop 103 as a second optical member.

The lens microcomputer 115, which is the lens controller, receives a driving instruction of the focus lens 105 from the camera microcomputer 116, and performs focusing by driving the focus lens 105 in an optical axis direction by the focus driving source 112 on the basis of the driving instruction. The lens microcomputer 115 receives a driving instruction for the stop 103 from the camera microcomputer 116, and adjusts the amount of light passing through the image pickup optical system by driving the stop 103 with the focus driving source 119. Further, the lens microcomputer 115 receives a driving instruction of the magnification-varying lens 102 from the camera microcomputer 116, and performs zooming by driving the magnification-varying lens 102 in an optical axis direction by the zoom driving source 111 on the basis of the driving instruction.

Moreover, a communication of data is performed between the camera microcomputer 116 and the lens microcomputer 115. The image pickup element 106 performs a charge accumulation within a predetermined duration in a vertical synchronizing time period that is a cycle of a vertical synchronizing signal output from a signal generating circuit 120. The camera microcomputer 116 transmits the vertical synchronizing signal to the lens microcomputer 115, and as described below, the camera microcomputer 116 and the lens microcomputer 115 communicate based on a timing of the vertical synchronizing signal.

Next, a processing performed in the camera microcomputer 116 in the camera unit 118 will be described with reference to FIG. 5. The processing is executed according to a computer program that is stored in the camera microcomputer 116. After-mentioned Steps 502 to 511 are performed during one vertical synchronizing time period.

Step 501 indicates a start of the processing. In Step 502, the camera microcomputer 116 waits the output of the vertical synchronizing signal to time the communication.

In Step 503, the camera microcomputer 116 communicates with the lens microcomputer 115 (first communication), and acquires a position of the focus lens.

In Step 504, the camera microcomputer 116 clears an effective bit (details describe below) of a driving instruction in a communication buffer. In this embodiment, the effective bit of the driving instruction is cleared after the first communication of Step 503, but the invention is not limited to the configuration and may be configured to clear the effective bit within a time period from after a second communication in Step 511 to before the next first communication in Step 503. In particular, it is only necessary that the effective bit is cleared from after the second communication in Step 511 to before TVAF processing in Step 506 in the next vertical synchronizing time period.

In Step 505, various task processings of Step 506 to 509 including a TVAF processing that is performed in the camera microcomputer 116 in synchronization with the vertical synchronizing signal are invoked. In Step 506, the camera microcomputer 116 performs the TVAF processing, and in Step 507 to 509, the camera microcomputer 116 performs the other camera processings.

In Step 510, the camera microcomputer 116 monitors whether the TVAF processing has completed and whether a predetermined time period has elapsed from the output of the vertical synchronizing signal. When the TVAF processing has completed or the predetermined time period has elapsed from the output of the vertical synchronizing signal, it proceeds to Step 511, and the camera microcomputer 116 communicates with the lens microcomputer 115 (second communication) and transmits the driving instruction of the focus lens. Even if the TVAF processing has not been completed, when the predetermined time period has elapsed from the output of the vertical synchronizing signal, it proceeds to Step 511. Then, it returns to Step 502, and the next vertical synchronizing signal is timed.

Figure 6:
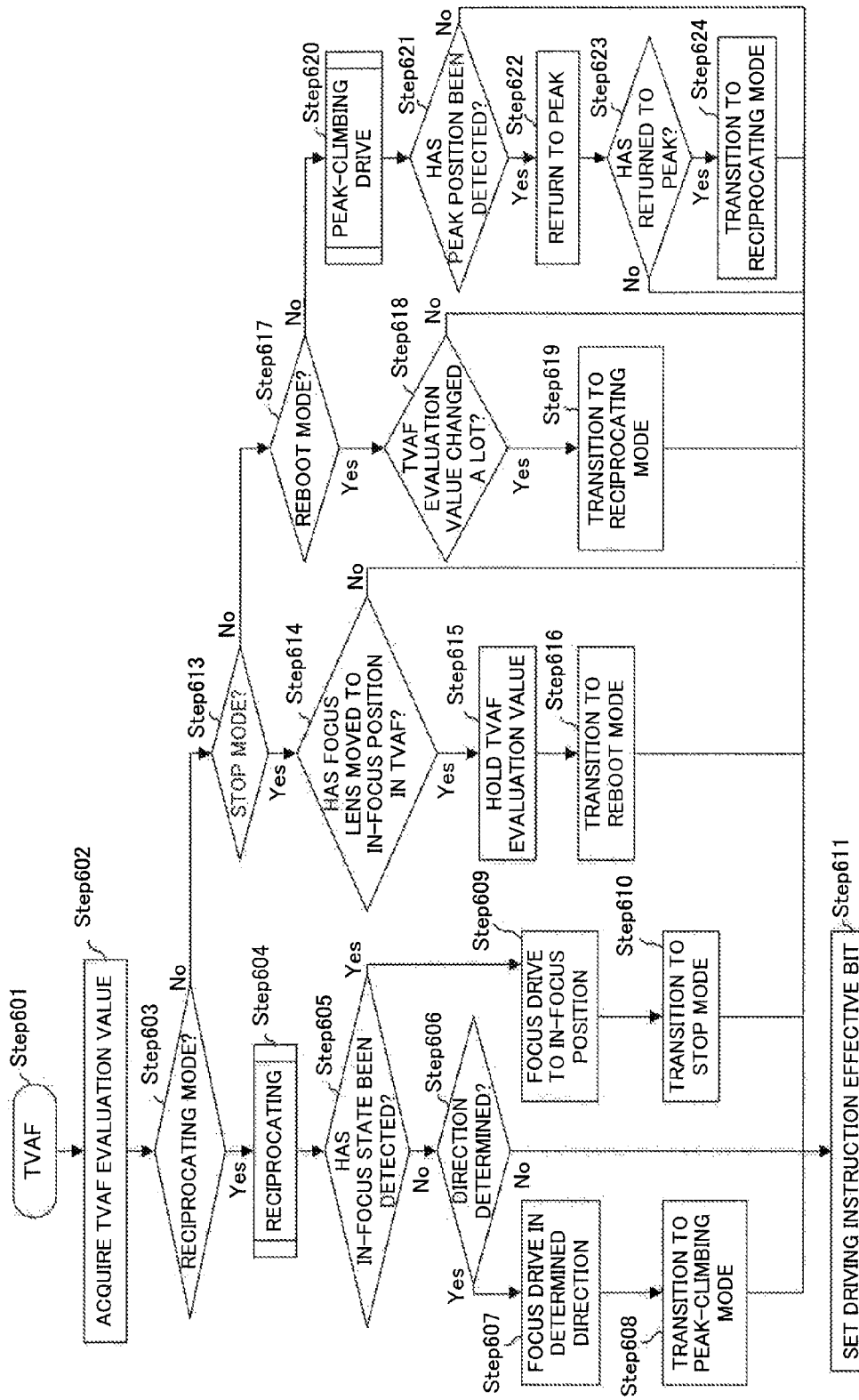
FIG. 6 is a flowchart of the TVAF control in embodiment of the present invention.

Next, a TVAF control that is performed in the camera microcomputer 116 in the camera unit 118 will be described with respect to the drawings from FIG. 6. The TVAF control is executed according to the computer program stored in the camera microcomputer 116.

Step 601 indicates a start of the processing. In Step 602, the camera microcomputer 116 acquires a TVAF evaluation value. In Step 603, the camera microcomputer 116 determines whether the mode of the TVAF processing is set to a reciprocating mode. The reciprocating mode denotes a mode that determines whether an in-focus state has been reached and, when the in-focus state has not been reached, determines a focus drive direction towards an in-focus position. The details of the operations of the reciprocating mode are described with reference to FIG. 7. If the TVAF processing mode is set to the reciprocating mode, it proceeds to Step 604 and the reciprocating operation is performed, and if the TVAF processing mode is not set to the reciprocating mode, it proceeds to Step 613.

In Step 604, the camera microcomputer 116 performs the reciprocating operation, and in Step 605, the camera microcomputer 116 determines whether the in-focus state has been detected in Step 604. If the in-focus state has been detected, it proceeds to Step 609, and the camera microcomputer 116 performs a setting for driving the focus lens to the in-focus position. Then, the camera microcomputer 116 changes the mode to a stop mode in Step 610, sets the effective bit of the driving instruction in Step 611, and ends the processing in Step 612. If it is determined in Step 605 that the in-focus state has not been detected, it proceeds to Step 606.

In Step 606, the camera microcomputer 116 determines whether the direction of the in-focus position has been determined. If the direction has been determined, it proceeds to Step 607, and the camera microcomputer 116 performs a setting for performing a peak-climbing drive toward the determined direction. The camera microcomputer 116 changes the mode to a peak-climbing mode in Step 608, sets the effective bit of the driving instruction in Step 611, and ends the processing in Step 612. If the direction of the in-focus position has not been determined, it proceeds to Step 611, and the camera microcomputer 116 sets the effective bit of the driving instruction, and the processing is ended in Step 612.

In Step 613, the camera microcomputer 116 determines whether the mode of the TVAF processing is set to the stop mode. The stop mode denotes a mode for moving the focus lens to the in-focus position and stopping it. If the mode is set to the stop mode, it proceeds to Step 614, and the camera microcomputer 116 determines whether the focus lens has moved to the in-focus position in TVAF. If the mode is not set to the stop mode, it proceeds to Step 617.

If the focus lens has moved to the in-focus position of the TVAF in Step 614, it proceeds to Step 615. If the focus lens has not moved to the in-focus position in the TVAF, it proceeds to Step 611 and the camera microcomputer 116 sets the effective bit of the driving instruction, and the processing is ended in Step 612. In Step 615, the camera microcomputer 116 holds a TVAF evaluation value of the in-focus position, and in Step 616, the camera microcomputer 116 changes the mode to a reboot mode. Then, it proceeds to Step 611 and the camera microcomputer 116 sets the effective bit of the driving instruction, and the processing is ended in Step 612.

In Step 617, it is determined whether the mode of the TVAF processing is set to the reboot mode. When a change occurs during monitoring of the TVAF evaluation value after the focusing is stopped, the reboot mode denotes a processing to active the TVAF again on the assumption that an object to be taken is changed. If the mode is set to the reboot mode, it proceeds to Step 618 and the camera microcomputer 116 determines whether the TVAF evaluation value is changed a lot. If the mode is not set to the reboot mode, it proceeds to Step 620.

If the TVAF evaluation value is changed a lot (e.g. by an amount greater than a predetermined threshold) in Step 618, it proceeds to Step 619. If not, it proceeds to Step 611 and the effective bit of the driving instruction is set, and the processing is ended in Step 612. The camera microcomputer 116 changes the mode of the TVAF processing to the reciprocating mode in Step 619, it proceeds to Step 611 and the camera microcomputer 116 sets the effective bit of the driving instruction, and the processing is ended in Step 612.

In Step 620, the camera microcomputer 116 performs the peak-climbing drive for the focus lens 105 in the direction determined in Step 604 at a predetermined speed, a position of the focus lens at which the TVAF evaluation value peaks is sought based on a relationship of the TVAF evaluation value and the focus lens position acquired from the lens microcomputer 115. The detailed operations of the peak-climbing drive will be described with reference to FIG. 14.

In Step 621, the camera microcomputer 116 determines whether a focus lens position at which the TVAF evaluation value peaks is detected during the peak-climbing drive operation. If the peak focus lens position is detected, it proceeds to Step 622, and if not, it proceeds to Step 611 and the camera microcomputer 116 sets the effective bit of the driving instruction, and the processing is ended in Step 612.

In Step 622, the camera microcomputer 116 performs the setting so as to return the focus lens to the focus lens position at which the TVAF evaluation value peaks during the peak-climbing drive operation. In Step 623, the camera microcomputer 116 determines whether the focus lens is returned to the focus lens position at which the TVAF evaluation value peaks. If the focus lens is returned to the focus lens position of the peak, the camera microcomputer 116 sets the mode of the TVAF processing to the reciprocating mode in Step 624. If the focus lens is not returned to the peak focus lens position, it proceeds to Step 611 and the camera microcomputer 116 sets the effective bit of the driving instruction, and the processing is ended in Step 612.

Figure 5:
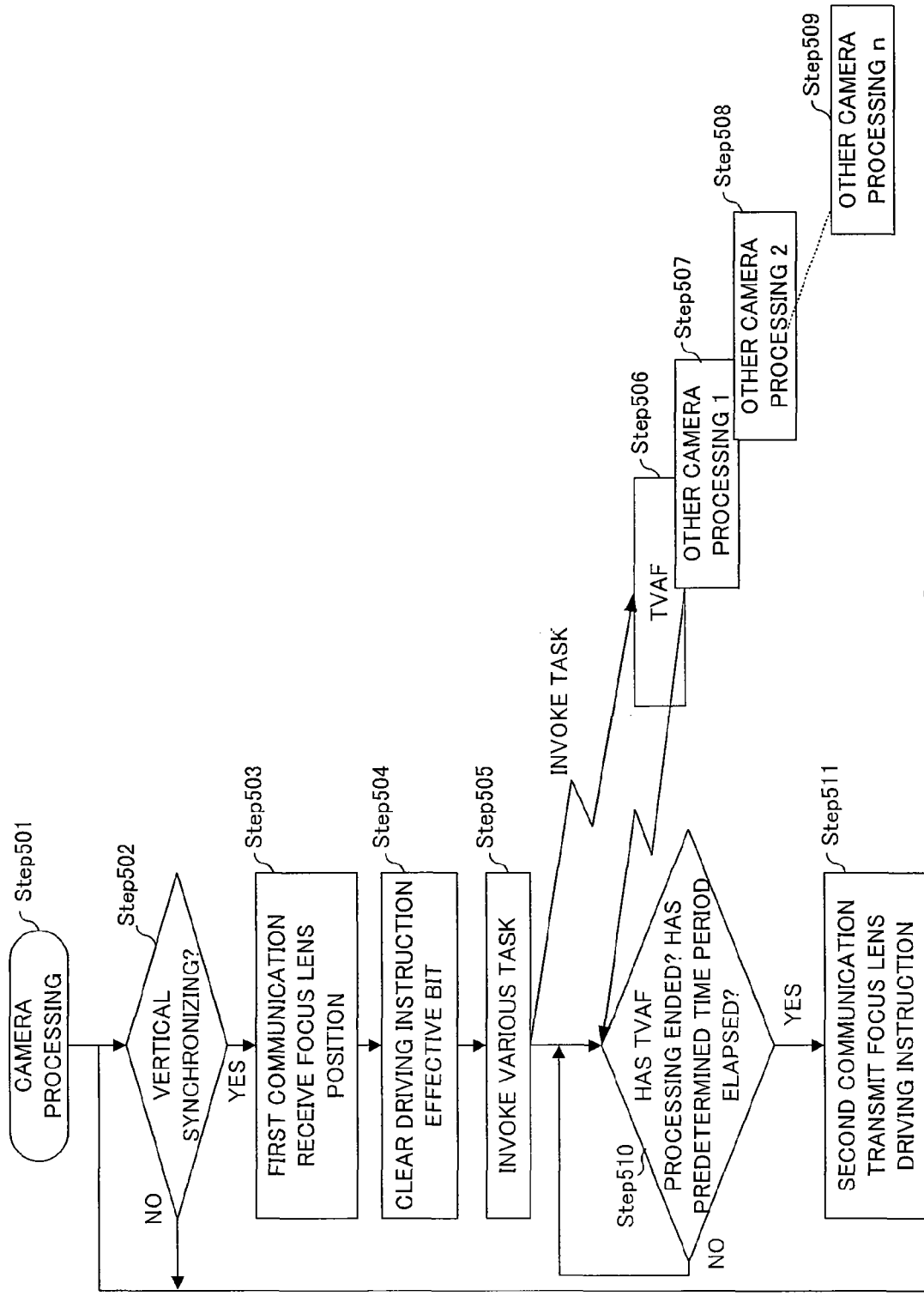
FIG. 5 is a flowchart of a camera processing in embodiment of the present invention.

As above, if the TVAF processing has been completed, the effective bit of the driving instruction is set, and if the TVAF processing has not been completed, the effective bit of the driving instruction is kept at a state that is cleared in Step 504 of FIG. 5.

The reciprocating operation will be described with reference to FIG. 7.

Step 701 indicates a start of the processing.

In Step 702, the camera microcomputer 116 waits the output of the vertical synchronizing signal to time the communication.

In Step 703, the camera microcomputer 116 communicates information including the focus lens position with the lens microcomputer 115. This communication is a fixed-length packet communication.

In Step 704, the camera microcomputer 116 calculates a drive cycle and a drive delay time period. The drive cycle denotes a time period from a start of a drive of the focus lens to the close (infinity) side to a start of a next drive to the infinity (close) side. The drive delay time period denotes a time period from the output of the vertical synchronizing signal to the start of the drive of the focus lens. Alternatively, the drive delay time may be defined on a basis of a charge accumulation start timing of the image pickup element 106 for producing the image signal or on a basis of a delay time from (that is, on a basis of) the start of after-mentioned first communication. The drive cycle is set to 2V and the drive delay time period is set to ½V in this embodiment, but those are not limited to the values.

In Step 705, the camera microcomputer 116 determines whether the current mode is 0. If it is 0, it proceeds to Step 706 and the camera microcomputer 116 performs after-mentioned processing at the focus lens position on the close side, and if it is not 0, it proceeds to Step 711.

<Processing at Focus Lens Position on Close Side>

In Step 706, the camera microcomputer 116 stores the TVAF evaluation value as a TVAF evaluation value on an infinity side, which is based on the output of the sensor that is accumulated when the focus lens is located on the infinity side.

An adding is performed for "Mode" (when it is 4 or more, it is returned to 0) in Step 707, and it proceeds to Step 708.

<Common Processing>

If a direction is determined as the in-focus direction for a first predetermined number of times in a row at Step 708, it proceeds to Step 727, and if not, it proceeds to Step 709.

In Step 709, if the focus lens repeatedly gets there and back in the same area for a second predetermined number of times in a row, it proceeds to Step 728, and if the focus lens does not repeatedly get there and back in the same area for a second predetermined number of times in a row, it proceeds to Step 710.

In Step 710, the camera microcomputer 116 communicates information including the driving instruction with the lens microcomputer 115, and it returned to Step 702. This communication is a fixed-length packet communication.

In Step 727, the camera microcomputer 116 recognizes that the direction has been determined, and it proceeds to Step 730 and the processing is ended to transmit the peak-climbing drive.

In Step 728, the camera microcomputer 116 calculates an average position of the focus lens position during the predetermined time period as an in-focus position. In Step 729, the camera microcomputer 116 recognizes that the in-focus state has been determined, and it proceeds to Step 730 and the processing is ended to transit the stop of the focusing or the determination of the reboot.

In Step 711, the camera microcomputer 116 determines whether the current "Mode" is 1. If it is 1, it proceeds to Step 712 and a processing of driving after-mentioned focus lens 105 in the infinity direction, and if not, it proceeds to Step 718.
<Processing to Drive Focus Lens to Infinite Side>

In Step 712, the camera microcomputer 116 calculates reciprocation amplitude and center movement amplitude in the reciprocating. Although the details are not described here, in general, with reference to the depth of focus, the amplitude is made smaller when the depth is shallow and is made larger when the depth is deep. The reciprocation amplitude denotes a movement amount of the focus lens from the close side to the infinity side in when there is not a movement of the center position of the reciprocation (center movement). The center movement amplitude denotes a movement amount of the center position of the reciprocation. The camera microcomputer 116 calculates the reciprocation amplitude and the center movement amplitude as a value of a movement amount of an image plain. This is because the proportion (sharpness) of the image plane movement amount to the drive amount of the focus lens differs with each lens unit and it is necessary to acquire detailed information on the specification of the lens unit at every mounting of a new lens unit in order that the camera calculates a real drive amount of the focus lens.

In Step 713, the camera microcomputer 116 compares the above-mentioned TVAF evaluation value of the infinity side in Mode=0 with after-mentioned TVAF evaluation value of the close side in Mode=2. If the infinity side TVAF evaluation value is larger than the close side TVAF evaluation value, it proceeds to Step 714, and if the infinity side TVAF evaluation value is not larger than the close side TVAF evaluation value, it proceeds to Step 715.

In Step 714, the driving amplitude is defined using the following expression:

driving amplitude=reciprocation amplitude+center movement amplitude

In Step 715, the driving amplitude is defined using the following expression:

driving amplitude=reciprocation amplitude

In Step 716, the camera microcomputer 116 determines that the focus lens is driven in the infinity direction on the driving amplitude defined in Step 714 or Step 715.

An adding is performed for "Mode" (when it is 4 or more, it is returned to 0) in Step 717, and it proceeds to Step 708. The processings in Step 708 and below are as described above.

In Step 718, it is determined whether the current "Mode" is 2. If it is 2, it proceeds to Step 719, after-mentioned processing at the focus lens position on the infinity side, and If not, it proceeds to Step 721.
<Processing at Focus Lens Position on Infinite Side>

In Step 719, the camera microcomputer 116 stores the TVAF evaluation value as a TVAF evaluation value on a close side, which is based on the output of the sensor that is accumulated when the focus lens is located on the close side.

An adding is performed for "Mode" (when it is 4 or more, it is returned to 0) in Step 720, and it proceeds to Step 708.

The processing in Step 708 and below are as described above.
<Processing when Focus Lens Position is Driven to Close Side>

In Step 721, the camera microcomputer 116 calculates the reciprocation amplitude and the center movement amplitude. Although the details are not described here, in general, with reference to the depth of focus, the amplitude is made smaller when the depth is shallow and is made larger when the depth is deep. The reciprocation amplitude denotes a movement amount of the focus lens from the infinity side to the close side in when there is not a movement of the center position of the reciprocation (center movement). The center movement amplitude denotes a movement amount of the center position of the reciprocation. The camera microcomputer 116 calculates the reciprocation amplitude and the center movement amplitude as a value of a movement amount of an image plain.

In Step 722, the camera microcomputer 116 compares the above-mentioned TVAF evaluation value of the infinity side in Mode=0 with the above-mentioned TVAF evaluation value of the close side in Mode=2. If the close side TVAF evaluation value is larger than the infinity side TVAF evaluation value, it proceeds to Step 723. If the close side TVAF evaluation value is not larger than the infinity side TVAF evaluation value, it proceeds to Step 724.

In Step 723, the driving amplitude is defined using the following expression:

driving amplitude=reciprocation amplitude+center movement amplitude

In Step 724, the driving amplitude is defined using the following expression:

driving amplitude=reciprocation amplitude

In Step 725, the camera microcomputer 116 determines that the focus lens is driven in the close direction on the driving amplitude defined in Step 723 or Step 724.

An adding is performed for "Mode" (when it is 4 or more, it is returned to 0) in Step 726, and it proceeds to Step 708. The processing in Step 708 and below are as described above.

Figure 8:
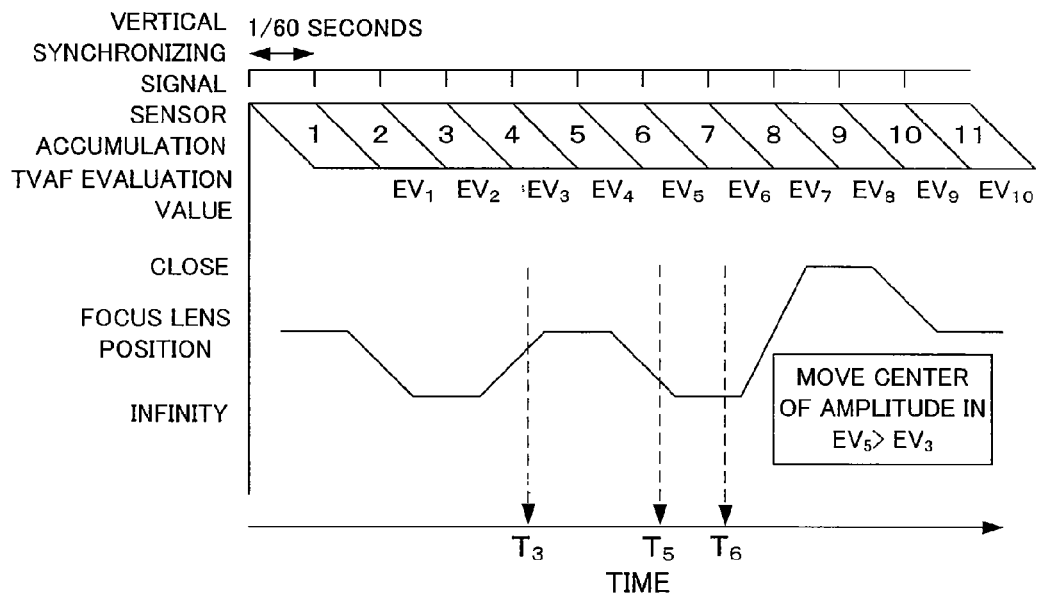
FIG. 8 is a diagram for explaining the reciprocating operation in embodiment of the present invention.
Figure 9:
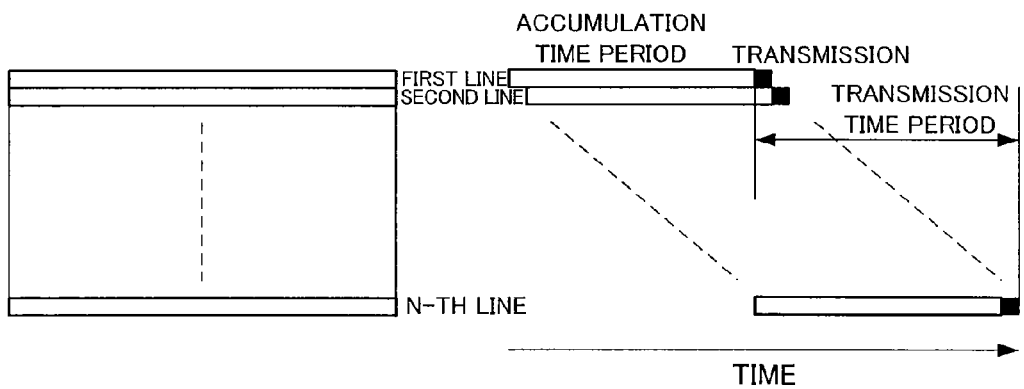
FIG. 9 is a diagram for explaining a timing of an accumulation of a CMOS sensor in embodiment of the present invention.

FIG. 8 illustrates a progression of the above-mentioned focus lens operation over time. The horizontal axis represents time, the concave upward cycle at the top represents a vertical synchronizing signal of the image signal, the diamond shape beneath represents an accumulating time of the CMOS sensor, the $EV_x$ beneath represents a TVAF evaluation value that is obtained at the time, and the bottom represents a focus lens position. The drive of the CMOS sensor will be described with reference to FIG. 9. The left of FIG. 9 illustrates an image plane and scanning lines. The right of FIG. 9 illustrates an accumulating time and a transfer time in each scanning line. Since the CMOS sensor is referred to "rolling shutter" and uses a method of releasing the shutter in each scanning line, the accumulating time and the transfer time are different between the top and the bottom of the screen as illustrated in FIG. 9. This accumulating time is represented by the diamond shape of FIG. 8.

Figure 7:
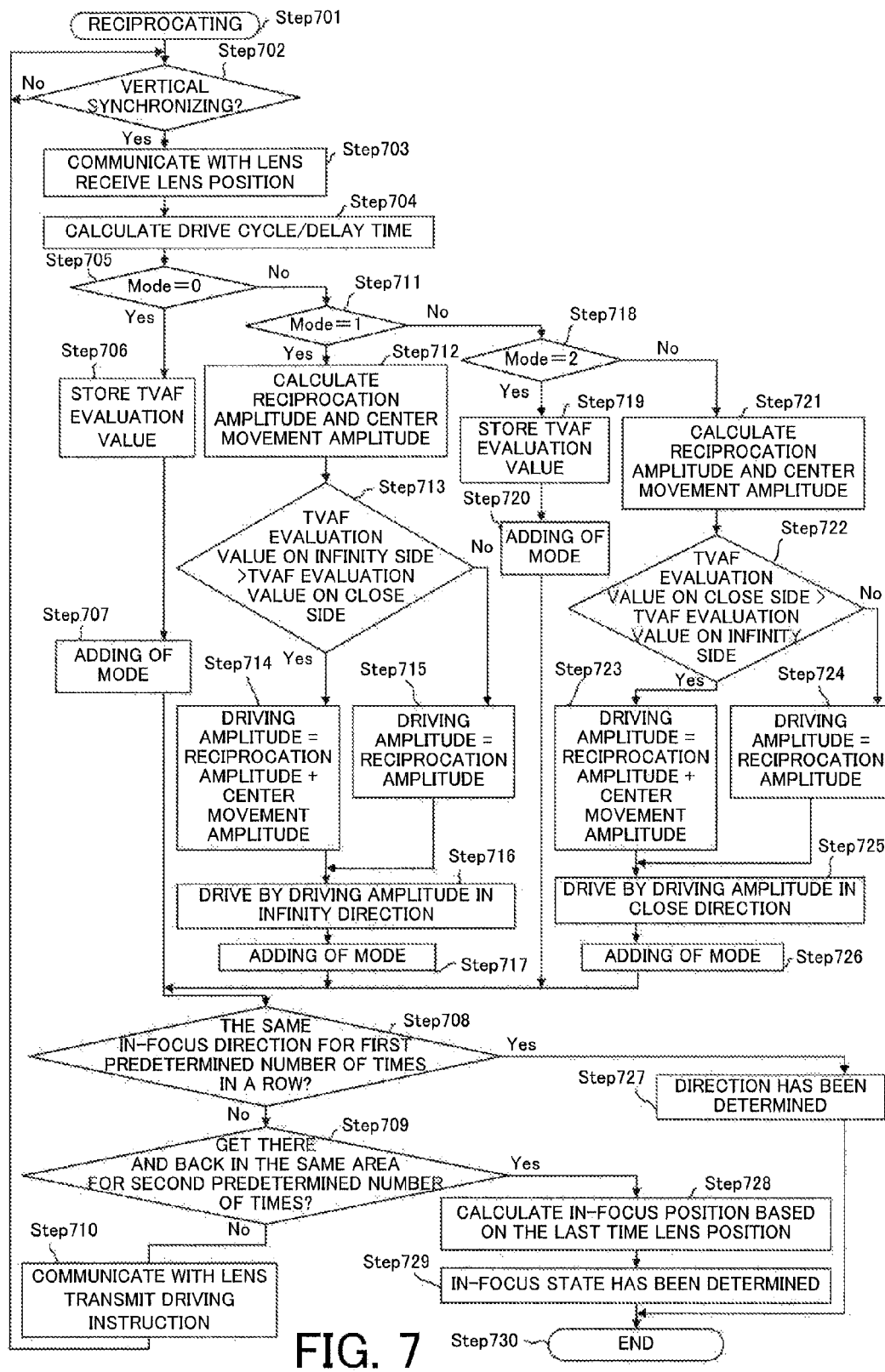
FIG. 7 is a flowchart of reciprocating operation in embodiment of the present invention.

In this embodiment, as illustrated in FIG. 7, the camera microcomputer 116 monitors the TVAF evaluation value while the focus lens 105 is moved to the close side or the infinity side, and the camera microcomputer 116 controls driving of the focus lens 105 in the in-focus direction. It is required to obtain the TVAF evaluation value from the image signal accumulated in the CMOS sensor while the focus lens 105 is stopped at the close/infinity side. The drive of the focus lens 105 must be timed depending on the accumulating time of the CMOS sensor. It is unnecessary to stop the focus lens at the close/infinity side during the whole of the accumulating time of the CMOS sensor, but it is necessary to stop the focus lens during the accumulating time of the scanning lines in a TVAF frame that is set as a part of an image. The TVAF evaluation value $EV_3$ for charge accumulated in the CMOS sensor during the accumulating time 3 is imported to the lens microcomputer 115 at the time $T_3$, and the TVAF evaluation value $EV_5$ for charge accumulated in the CMOS sensor during the accumulating time 5 is imported at the time T₅. At the time T₆, the camera microcomputer 116 compares the TVAF evaluation values EV3 and EV5. If $EV_5 > EV_3$ is satisfied, the position of the reciprocation center is moved, while if $EV_5 > EV_3$ is not satisfied, the position of the reciprocation center is not moved. As above, the camera microcomputer 116 determines the in-focus direction and the in-focus state.

Figure 10:
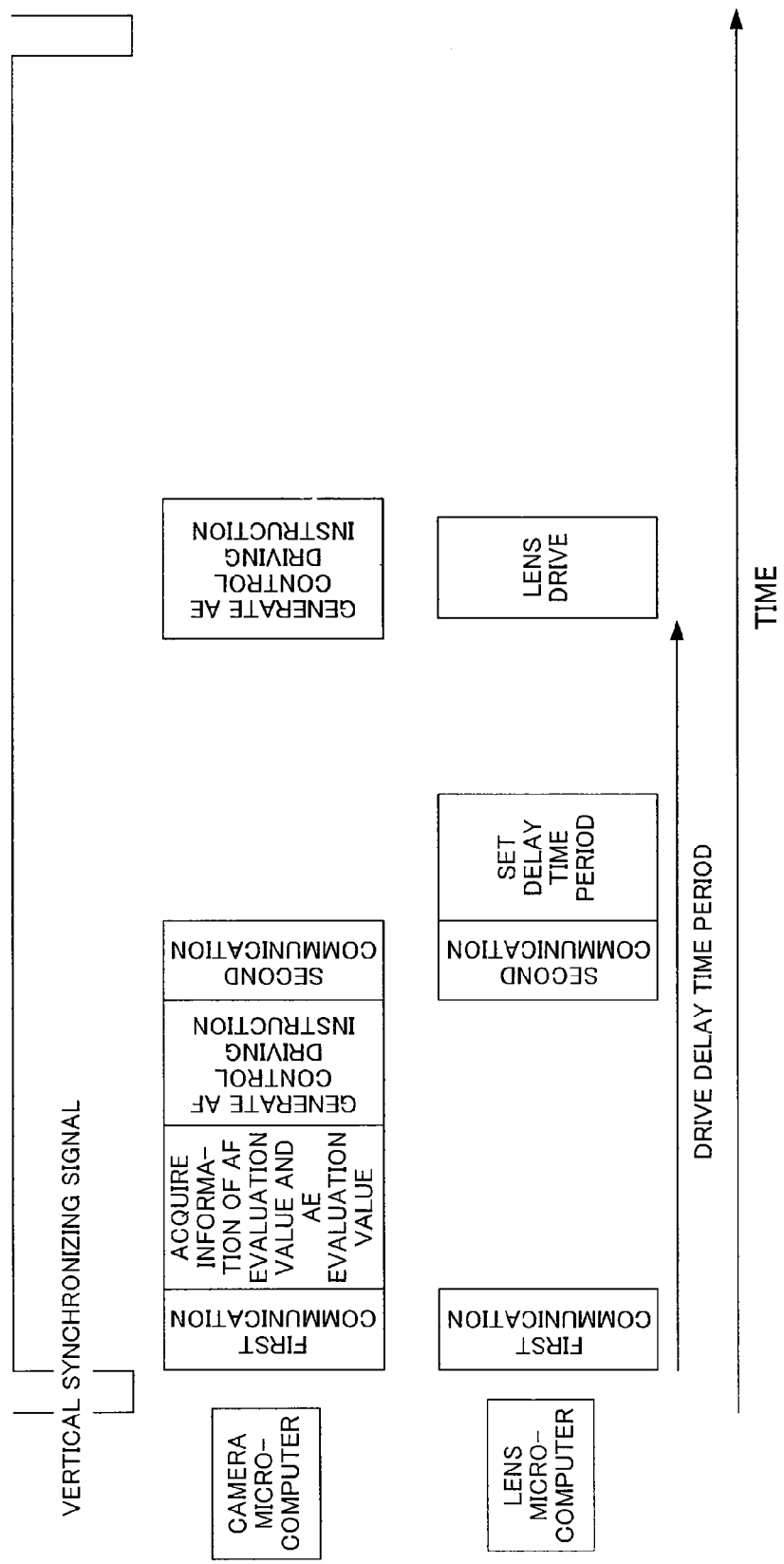
FIG. 10 is a timing chart of processing of a camera microcomputer and a lens microcomputer in embodiment of the present invention.
Figure 11:
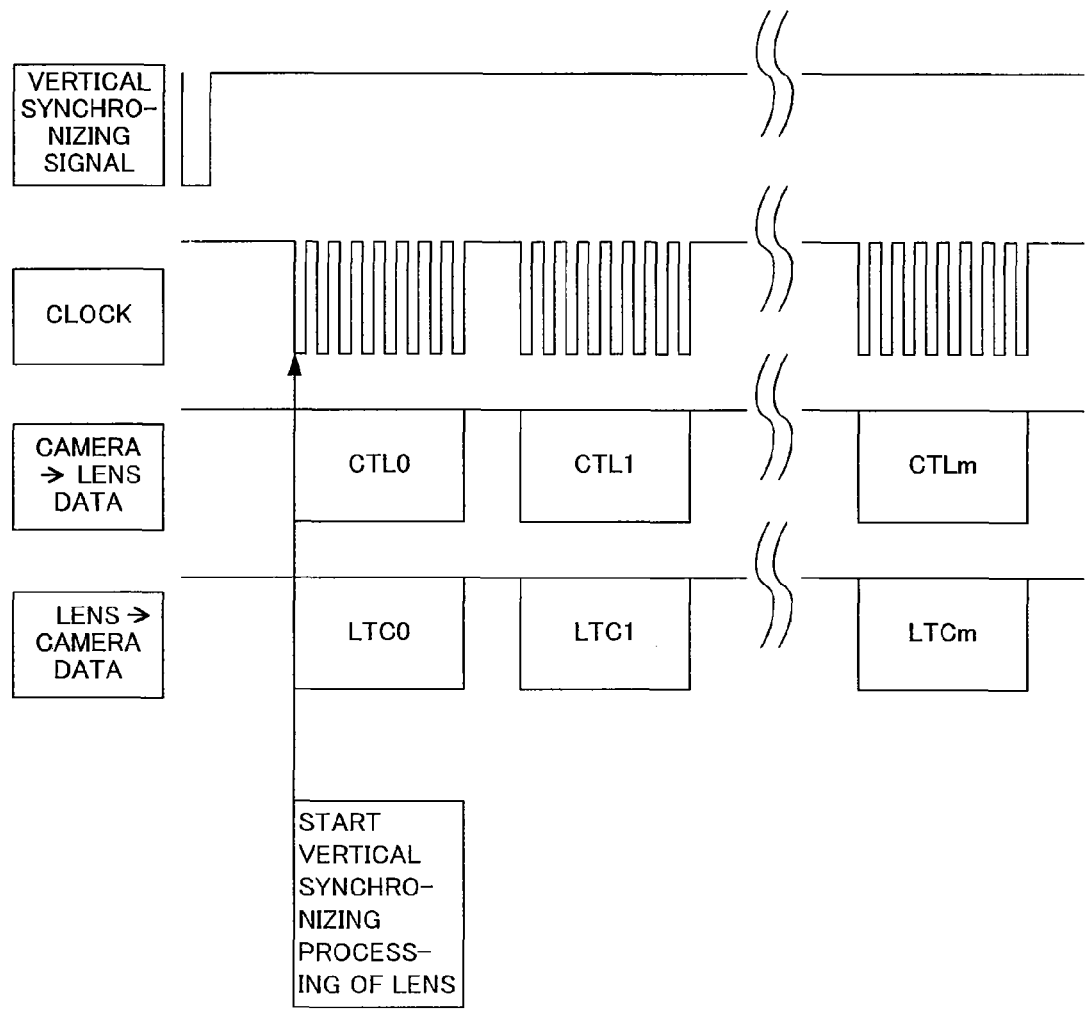
FIG. 11 is a diagram for explaining a serial communication in embodiment of the present invention.

The following is a description of FIG. 10. The horizontal axis denotes a time, and the processing of the camera microcomputer 116 and the lens microcomputer 115 during one vertical synchronizing time period are illustrated. First, the camera microcomputer 116 performs a first fixed-length serial packet communication (first communication) immediately after the vertical synchronizing signal is output, and the camera microcomputer 116 receives information in the lens unit from the lens microcomputer 115 (for example, data including a focus lens position or a stop position). The camera microcomputer 116 receives, as data regarding the AE control, data of the stop position from the lens microcomputer 115 in the first communication and therewith transmits control data of the stop and the like. Although it is not illustrated, the lens microcomputer 115 performs a stop drive control within the period from after the first communication to the next first communication (within one vertical synchronizing time period) on the basis of the control data of the stop that is obtained in this first communication. This first communication or after-mentioned second communication is performed by an interactive packet serial communication as illustrated in FIG. 11. A clock signal is output from the camera microcomputer 116 that generates the vertical synchronizing signal of the image pickup element. The lens microcomputer 115 executes a processing in synchronization with the vertical synchronizing signal by starting an internal processing in synchronization with an initiatory clock signal of the first communication that is transmitted from the camera microcomputer 116. In this embodiment, the first communication is performed immediately after the vertical synchronizing signal is output, but the invention is not limited to the configuration and it is only necessary that the first communication is started in synchronization with the output of the vertical synchronizing signal. For example, the first communication may be started at the predetermined time period after the vertical synchronizing signal is output.

After the first communication, the camera microcomputer 116 acquires the TVAF evaluation value (and the AE evaluation value), performs the TVAF control, and generates the next focus lens driving instruction. After the end of the TVAF control, the camera microcomputer 116 transmits data including the focus lens driving instruction to the lens microcomputer 115 in a second fixed-length packet serial communication (second communication). The focus lens driving instruction includes information on the reciprocation amplitude and the center movement amplitude as information on a drive target position of the focus lens. Further, the focus lens driving instruction includes information on a drive delay time period that is a timing of starting a drive of the focus lens. When the TVAF is not completed due to error or the like within the predetermined time period, the camera microcomputer 116 performs the second communication when a predetermined time period elapses after the vertical synchronizing signal is output. In this case, the lens microcomputer 115 holds data that is previously received. The lens microcomputer 115 calculates a focus drive target position after the focus lens driving instruction is received. At this time, information on the reciprocation amplitude or the center movement amplitude that is transmitted from the camera microcomputer 116 is a value of a movement amount of the image plane, and therefore the lens microcomputer 115 converts the received value to a real focus drive target position in view of the sensitivity for lens. Next, the lens microcomputer 115 performs a drive processing of the focus lens when the drive delay time period elapses after the vertical synchronizing signal is output.

The camera microcomputer 116 performs the AE control after the second communication, and generates the next stop driving instruction. Since the camera microcomputer 116 performs the AE control after the second communication, a feedback of the AE control delays compared as that of the AF control. This is because the responsiveness of the AF control has priority over that of the AE control. In particular, in order to prevent that the brightness on the screen suddenly changes in a still image shooting with a state where a live view image is displayed or a moving image shooting, the camera microcomputer 116 performs a control so as to slowly move the stop 103. In the meantime, it is desirable that the AF control is immediately performed. If the AE control is performed at the same time as the AF control (these are processed at the same time after the first communication), there is a delay in transmitting the focus driving instruction in the second communication. Therefore, in this embodiment, in order to make the responsiveness of the AF control a priority, the AF control is performed after the first communication and the AE control of performing a slow control to prevent the sudden change of the brightness on the screen is performed after the second communication.

FIG. 12 illustrates contents of the communication between the camera microcomputer 116 and the lens microcomputer 115. This illustrates only data used in the present embodiment.

The first communication communicates data including:
lens microcomputer→camera microcomputer
   stop position
   focus lens position
camera microcomputer→lens microcomputer
   stop target position
   stop drive speed
The second communication communicates data including:
camera microcomputer→lens microcomputer
   focus target position
   focus drive speed
   drive delay time period
   effective bit of the driving instruction
Furthermore, header data indicating the contents of the communication and check sum data to confirm whether the operation of the communication is ensured. In addition, "m" that denotes the number of commands communicated in the first communication is larger than "n" that denotes the number of commands communicated in the second communication.

As to the AE control, the lens microcomputer 115 transmits information on the stop position to the camera microcomputer 116 in the first communication, and the camera microcomputer 116 performs the AE control based on the received information on the stop position after the second communication. Then, the camera microcomputer 116 transmits stop drive information including the stop target position and the stop drive speed to the lens microcomputer 115 in the first communication of the next vertical synchronizing time period.

As to the AF control, the lens microcomputer 115 transmits information on the focus lens position to the camera microcomputer 116 in the first communication, and the camera microcomputer 116 performs the AF control based on the information on the focus lens position after the first communication. When the AF control is completed, the second communication is performed, and the camera microcomputer 116 transmits focus lens drive information including the focus target position, the focus drive speed, and the drive delay time period to the lens microcomputer 115.

Figure 16:
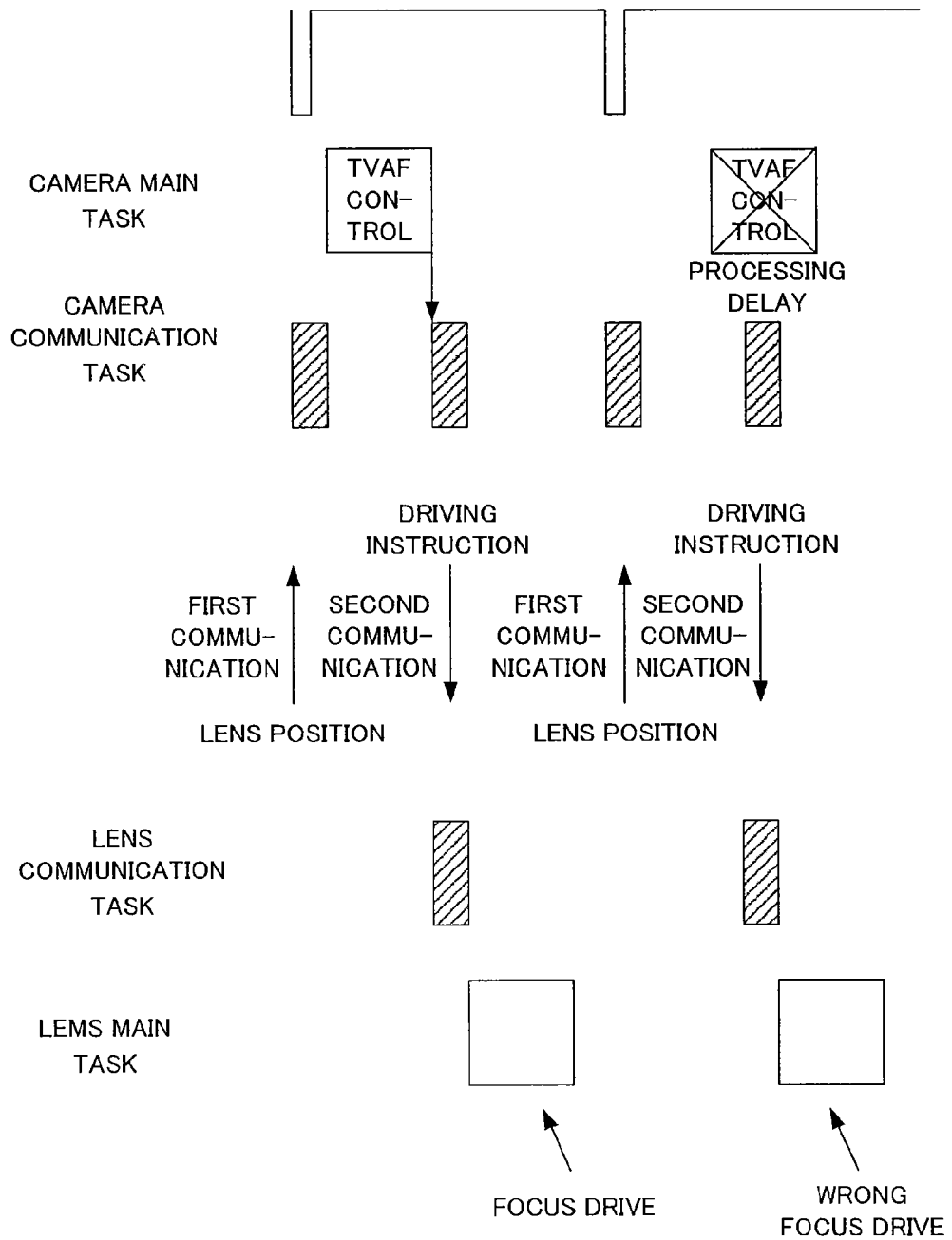
FIG. 16 is a diagram for explaining a malfunction caused in a communication between the lens unit and the camera unit.

Even when the AF processing is not completed within the predetermined time period after the vertical synchronizing signal is output, the second communication is performed after the predetermined time period elapses. In this case, even if the AF processing is not completed, data for the fixed-length packet communication is included in an area of the focus driving instruction of the second communication, and a wrong focus driving instruction in the AF control is transmitted in the second communication. Accordingly, as illustrated in FIG. 16, when the AF control is not completed within the predetermined time period due to the burden of the camera processing and the like, the wrong focus driving instruction is transmitted from the camera microcomputer 116 to the lens microcomputer 115. As a result, the lens microcomputer 115 executes a wrong focus drive and a malfunction occurs in the side of the lens unit 117.

Figure 17:
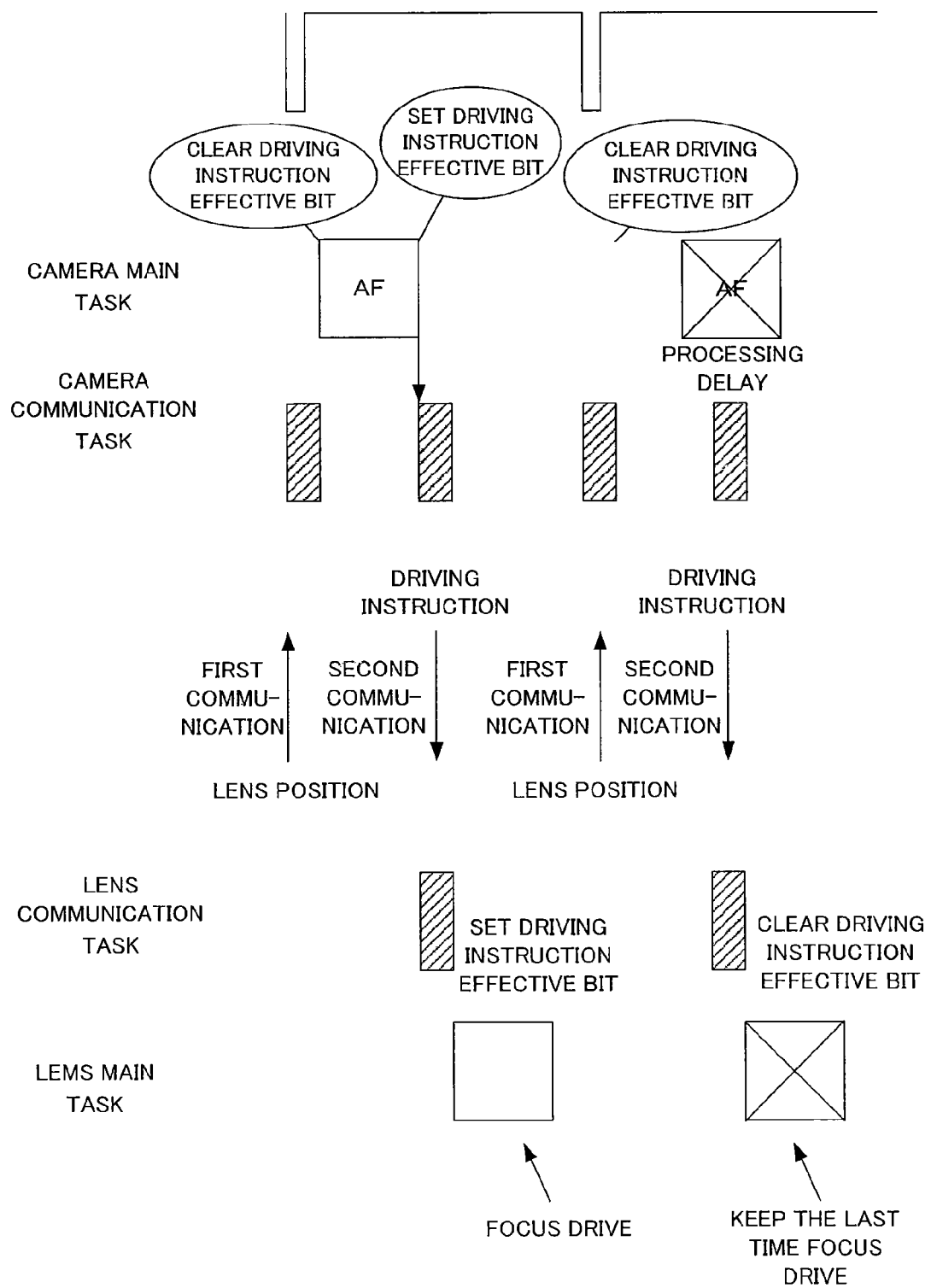
FIG. 17 is a diagram for explaining prevention against the malfunction caused in an embodiment of the present invention.

The present embodiment is characterized by using the effective bit of the driving instruction, which is a predetermined data area in the second communication, in order to prevent the occurrence of the malfunction. The effective bit of the driving instruction will be described with respect to FIG. 17. The camera microcomputer 116 clears the effective bit of the driving instruction after the first communication illustrated in FIG. 17 (that is, at a timing of Step 504 in FIG. 5). As described above, the invention is not limited to this timing. When the AF control is completed within a period between the first communication and the second communication, the camera microcomputer 116 sets the effective bit of the driving instruction at the time of the completion of the AF control. The setting and the clearing are switched by making the signal level of the effective bit of the driving instruction different from each other. This effective bit of the driving instruction is not set until the completion of the AF control (until Step 611 in FIG. 6).

In the meantime, the lens microcomputer 115 determines whether the effective bit of the driving instruction transmitted from the camera microcomputer 116 in the second communication is set or cleared. If the effective bit of the driving instruction is set, the lens microcomputer 115 determines the focus lens driving instruction received from the camera microcomputer 116 in the second communication is valid. If the effective bit of the driving instruction is cleared, the lens microcomputer 115 determines the focus lens driving instruction received from the camera microcomputer 116 is invalid.

When the AF control is completed within the predetermined time period (the left of FIG. 17), the camera microcomputer 116 sets the effective bit of the driving instruction. In this case, the lens microcomputer 115 acquires the set effective bit of the driving instruction and the focus lens driving instruction in the second communication. The lens microcomputer 115 determines that the acquired focus lens driving instruction is valid, and can appropriately drive the focus lens in accordance with the driving instruction of the focus lens. When the AF control is not completed within the predetermined time period (the right of FIG. 17), the camera microcomputer 116 does not set the effective bit of the driving instruction. In this case, the lens microcomputer 115 acquires the cleared effective bit of the driving instruction and the focus lens driving instruction in the second communication. Then, the lens microcomputer 115 determines that the acquired focus lens driving instruction is invalid, and keeps the focus lens driving instruction acquired in the last time second communication in defiance of the invalid focus lens driving instruction. Accordingly, even if the lens microcomputer 115 receives a wrong focus lens driving instruction from the camera microcomputer 116 in the second communication, the lens microcomputer 115 does not drive the focus lens on the basis of the wrong focus lens driving instruction. Therefore, the malfunction does not occur.

As above, in the embodiment, the camera microcomputer 116 transmits, to the lens microcomputer 115 along with the focus lens driving instruction, information on whether the focus lens driving instruction is valid or not. The lens microcomputer 115 can determine whether the focus lens driving instruction received from the camera microcomputer 116 is correct or wrong by receiving the information on whether the focus lens driving instruction is valid or not. Therefore, even if a wrong focus lens driving instruction is transmitted from the camera microcomputer 116, the lens microcomputer 115 in this embodiment can prevent a malfunction of executing the drive of the focus lens using the wrong focus lens driving instruction.

In addition, a plurality of types of the effective bit of the driving instruction may be set in accordance with the AF control. In this embodiment, the focus lens drive information is transmitted using the same communication format between the reciprocating and the peak-climbing drive. It may be shown whether the transmitted focus lens drive information is the drive information of the reciprocating, the drive information of the peak-climbing drive, or the information of the stopping instruction, according to the effective bit of the driving instruction.

In order to drive the focus lens 105 on the basis of the vertical synchronizing signal, the present invention performs the fixed-length packet communication (first communication) immediately after the vertical synchronizing signal is output, and controls the drive of the focus lens 105 by causing the processing of the lens unit 117 to delay by a certain time period on the basis of the vertical synchronizing signal. In a system of emphasizing the timing of the communication as above, it is desirable to cancel the delay in the communication. The delay in the communication can be cancelled by preliminarily defining a content which is communicated at a predetermined timing (second communication) and then preparing the communicated content by the predetermined timing in the real operation.

Figure 13:
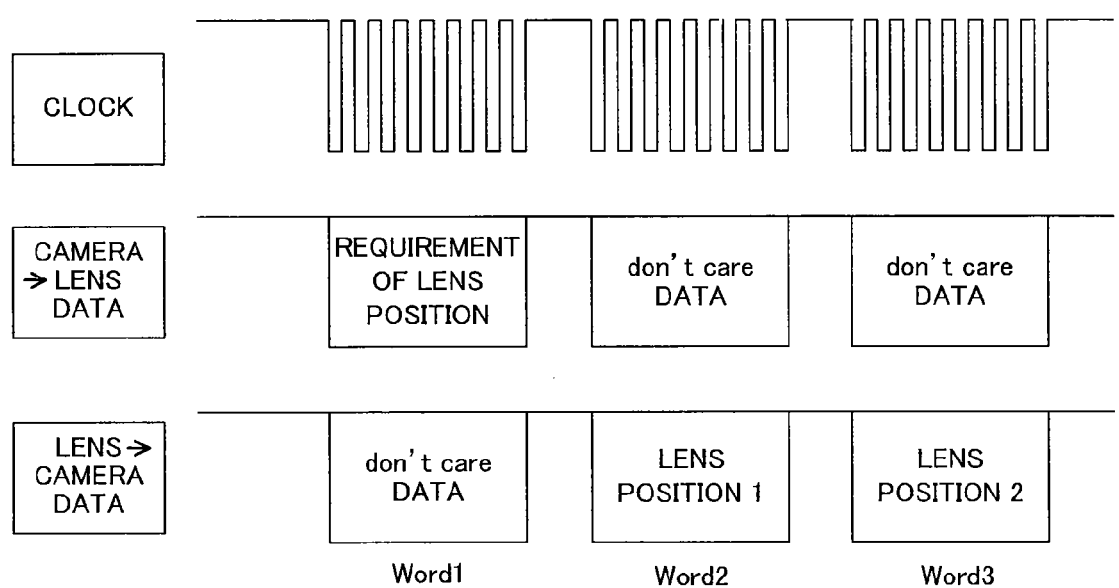
FIG. 13 is a diagram for explaining a usual command communication.

On the other hand, in a command communication used when a still image is shot without a live view, it is not determined when and what content is transmitted and received. In this command communication, as illustrated in FIG. 13, the camera microcomputer 116 transmits a command to the lens microcomputer 115 to require data of the lens unit or to control the optical member. After the command is received, the lens microcomputer 115 analyzes the command to start the operation, and prepares data that is returned to the camera. In this case, since the lens microcomputer 115 recognizes the instruction from the camera microcomputer only after the command is analyzed, delay or the like may be caused. However, the command communication has an advantage in a communication that does not have a periodicity. In other words, it may have an advantage in term of enabling the command to be transmitted from the camera microcomputer 116 to the lens microcomputer 115 at arbitrary time regardless of the cycle.

In the camera system of this embodiment, a command communication method and a communication method of communicating at a fixed length in synchronization with the vertical synchronizing signal can be switched.

Figure 14:
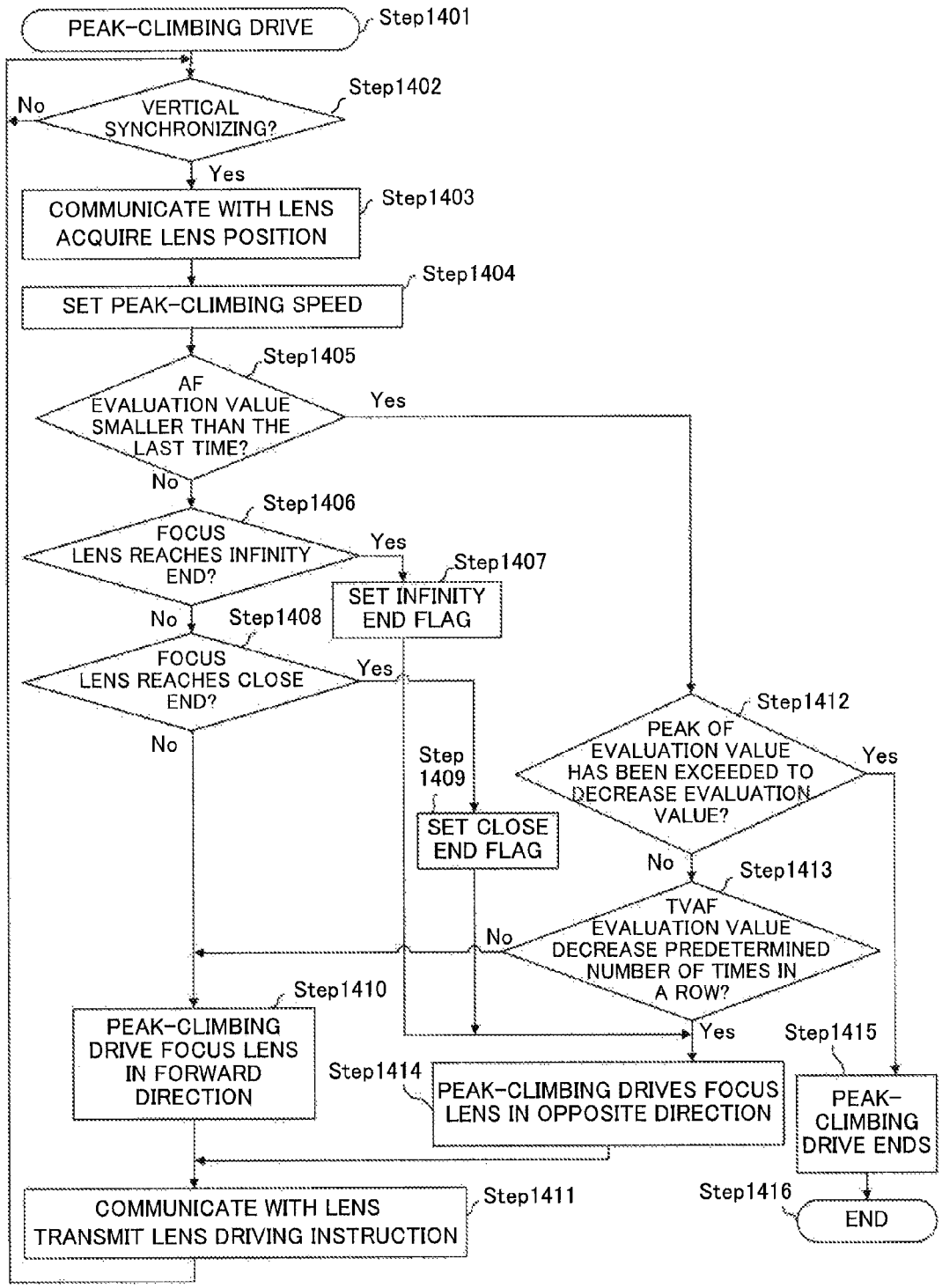
FIG. 14 is a flowchart of a peak-climbing drive in embodiment of the present invention.

Next, the peak-climbing drive operation will be described with respect to FIG. 14.

Step 1401 indicates a start of the processing.

In Step 1402, the camera microcomputer 116 waits the output of the vertical synchronizing signal to time the communication.

In Step 1403, the camera microcomputer 116 communicates with the lens microcomputer 115 and acquires the information on the focus lens position.

In Step 1404, the camera microcomputer 116 calculates a peak-climbing drive speed. Although the details are not described here, in general, with reference to the depth of focus, the speed is reduced when the depth is shallow and increased when the depth is deep. As a result, a change amount of blur becomes more certain to a viewer, and viewing discomfort is reduced or disappears.

The camera microcomputer 116 determines whether the TVAF evaluation value is smaller by a predetermined amount than the last time TVAF evaluation value in Step 1405. If the TVAF evaluation value is not small, it proceeds to Step 1406, and if the TVAF evaluation value is small, it proceeds to Step 1412. The predetermined amount denotes a value determined in view of S/N of the TVAF evaluation value, and is not less than a range of fluctuation of the TVAF evaluation value when the object is fixed and the focus lens position is certain. Otherwise the fluctuation of the TVAF evaluation value has an influence, and the peak-climbing drive cannot be performed in a correct direction.

In Step 1406, the camera microcomputer 116 determines whether the focus lens 105 reaches an infinity end. The infinity end denotes a position that is determined in design choice and is closest to the infinity side in a stroke of the focus lens. If the focus lens reaches the infinity end, it proceeds to Step 1407. If the focus lens does not reach the infinity end, it proceeds to Step 1408.

In Step 1408, the camera microcomputer 116 determines whether the focus lens 105 reaches a close end. The close end denotes a position that is determined in design choice and is closest to the close side in the stroke of the focus lens. If the focus lens reaches the close end, it proceeds to Step 1409. If the focus lens does not reach the close end, it proceeds to Step 1410.

In each of Step 1407 and 1409, a flag that stores an opposite end is set, and it proceeds to Step 1414 and the peak-climbing drive is continued after the focus lens 105 is turned around in the opposite direction.

In Step 1410, the peak-climbing drive of the focus lens 105 is performed at the speed determined in Step 1404 in the last time forward direction. In Step 1411, the camera microcomputer 116 transmits the communication data determined in Step 1410 and Step 1414 to the lens microcomputer 115. Then, it returns to Step 1402 and the processing is continued.

In Step 1412, if the peak of the TVAF evaluation value has not been exceeded and the TVAF evaluation value has decreased, it proceeds to Step 1413. If the peak of the TVAF evaluation value has been exceeded and the TVAF evaluation value has decreased, it proceeds to Step 1415 and the peak-climbing drive is ended, and it proceeds to Step 1416 and the processing is ended to transition to the reciprocating operation.

In Step 1413, the camera microcomputer 116 determines whether the TVAF evaluation value decreases a predetermined number of times in a row. If the TVAF evaluation value decreases the predetermined number of times in a row, it proceeds to Step 1414, otherwise it proceeds to Step 1410.

In Step 1410, the peak-climbing drive of the focus lens 105 is performed at the speed determined in Step 1404 in the last time forward direction. In Step 1411, the camera microcomputer 116 transmits the communication data determined in Step 1410 to the lens microcomputer 115. Then, it returns to Step 1402 and the processing is continued.

In Step 1414, the focus lens 105 is peak-climbing driven at a speed determined in Step 1404 in a direction opposed to the last time direction. In Step 1411, the camera microcomputer 116 transmits communication data determined in Step 1410 to the lens microcomputer 115. Then, it returns to Step 1402 and it processing is continued.

Figure 15:
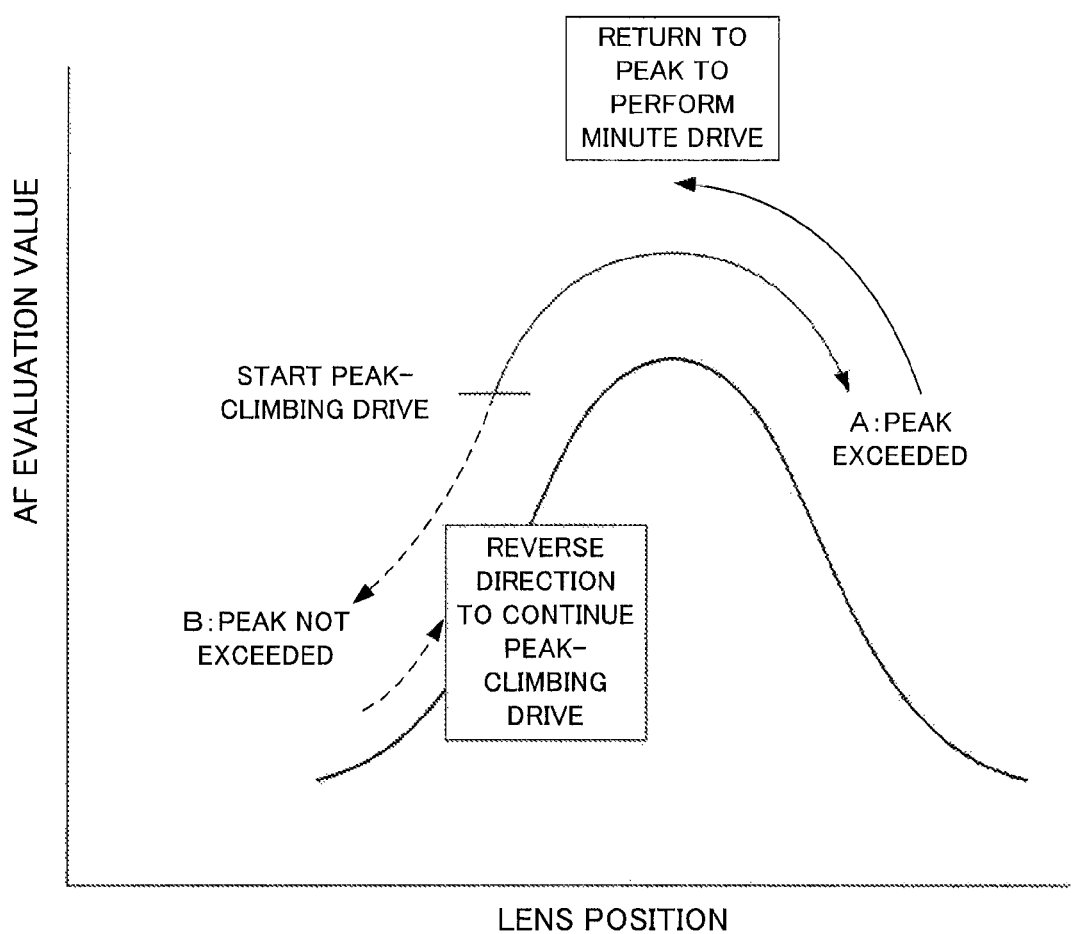
FIG. 15 is a diagram for explaining the mountain-climbing drive in an embodiment of the present invention.

FIG. 15 illustrates a movement of the focus lens 105 in the peak-climbing drive operation. The "A" (illustrated in solid line) represents an operation of determining that there is an in-focus position because the peak of the AF evaluation value has been exceeded and the AF evaluation value has decreased, of ending the peak-climbing drive operation, and of transiting the reciprocating operation. In contrast, the "B" (illustrated in dotted line) represents an operation of determining that the direction is wrong because no peak is found and the AF evaluation value decreases, and of continuing the peak-climbing drive operation.

As described above, the camera microcomputer 116 performs a control so that the TVAF evaluation value is constantly maximum by moving the focus lens 105 while the operations "reboot determination→reciprocating→peak-climbing drive→reciprocating→reboot determination" are repeated, and the in-focus state is maintained.

The present embodiment separately performs at least two kinds of fixed-length packet serial communication (first communication and second communication) during a predetermined cycle (one vertical synchronizing time period) in an interchangeable lens system. In other words, in the vertical synchronizing time period, which is an output cycle of the vertical synchronizing signal, the first communication and the second communication are separately performed. Moreover, the camera performs an AF control within a time period between the first communication and the second communication, and transmits the focus lens driving instruction to the lens unit in the second communication immediately after the AF control. As above, the camera performs the AF control based on the latest information of the lens position, and can immediately output the focus lens driving instruction. Therefore, the present invention can decrease the delay of the control cycle and improve a responsiveness of the AF.

Further, in the second communication, the camera transmits, to the lens unit along with the focus lens driving instruction, information whether the focus lens driving instruction is valid or not. On the basis of the information whether the focus lens driving instruction is valid or not, the lens unit can determine whether the focus lens driving instruction received from the camera is correct or incorrect. Therefore, even if an incorrect focus lens driving instruction is transmitted from the camera, the lens unit of this embodiment can prevent a malfunction of executing the drive of the focus lens in accordance with the incorrect focus lens driving instruction.

An example of a lens unit including a focus lens and a stop as an accessory has been described in the above embodiment, but the present invention is not limited to the configuration. For example, the present invention may be a strobe apparatus that includes at least two optical members as other accessories and is capable of being put on and taken off from the camera.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-004725, filed on Jan. 13, 2012, and Japanese Patent Application No. 2012-127915, filed on Jun. 5, 2012, which are hereby incorporated by reference herein in their entirety.

What is claimed is:

1. An image pickup apparatus capable of detachably mounting a lens unit including a plurality of optical members that includes a stop and a focus lens, the image pickup apparatus comprising:
    an image pickup unit configured to accumulate charge in synchronization with a vertical synchronizing signal to generate an image signal; and
    a control unit configured to generate control information for each of the stop and the focus lens of the mounted lens unit and configured to communicate the control information with the lens unit,
    wherein the control unit is configured to perform first communication in synchronization with the vertical synchronizing signal, and to perform second communication before the next first communication that is performed in synchronization with the next vertical synchronizing signal,
    wherein each of the first communication and the second communication is packet communication for communicating predetermined information at a fixed-length, and
    wherein the control unit is configured to receive first information including information on the stop and the focus lens from the lens unit in the first communication, generate the control information for each of the stop and the focus lens on the basis of the first information received in the first communication, transmit the control information for the focus lens to the lens unit in the second communication following the first communication, and then transmit the control information for the stop to the lens unit in the next first communication.

2. The image pickup apparatus according to claim 1, wherein the control unit is configured to control the focus lens before controlling the stop on the basis of the first information received in the first communication.

3. The image pickup apparatus according to claim 1, wherein, in the second communication, the control unit is configured to transmit, along with the control information for the focus lens, information indicating whether the control information is valid to the lens unit.

4. The image pickup apparatus according to claim 1, wherein, in a case that generation of the control information for the focus lens is not completed within a predetermined time period after the vertical synchronizing signal is output, the control unit is configured to transmit, in the second communication, information indicating that the control information is invalid along with the control information relating to the focus lens.

5. The image pickup apparatus according to claim 1, wherein, in a case that generation of the control information for the focus lens is not completed within a predetermined time period after the vertical synchronizing signal is output, the control unit is configured to set a signal level in a predetermined data area in the second communication to a first level, and
    in a case that the generation of the control information for the focus lens is completed within the predetermined time period after the vertical synchronizing signal is output, the control unit is configured to set the signal level of the predetermined data area in the second communication to a second level that is different from the first level.

6. The image pickup apparatus according to claim 1, wherein after the first communication, the control unit is configured to generate the control information for the focus lens on the basis of the first information received in the first communication, and then transmit the control information for the focus lens to the lens unit in the second communication following the first communication.

7. The image pickup apparatus according to claim 1, wherein after the second communication following the first communication, the control unit is configured to generate the control information for the stop on the basis of the first information received in the first communication and the image signal, and then transmit the control information for the stop to the lens unit in the next first communication.

8. The image pickup apparatus according to claim 1, wherein the first communication includes information relating to a position of the stop and a position of the focus lens.

9. The image pickup apparatus according to claim 1, wherein a number of commands communicated in the first communication is larger than a number of commands communicated in the second communication.

10. A lens unit capable of being detachably mounted on an image pickup apparatus including an image pickup unit that accumulates charge in synchronization with a vertical synchronizing signal to generate an image signal, the lens unit comprising:
    a plurality of optical members including a stop and a focus lens; and
    a lens control unit configured to communicate with an image pickup apparatus to which the lens unit is mounted and to control a drive of the stop and the focus lens on the basis of information received from the image pickup apparatus,
    wherein the lens control unit is configured to perform first communication in synchronization with the vertical synchronizing signal received from the image pickup apparatus, and to perform second communication before the next first communication that is performed in synchronization with the next vertical synchronizing signal,
    wherein each of the first communication and the second communication is packet communication for communicating predetermined information at a fixed-length, and
    wherein the lens control unit is configured to transmit first information including information on the stop and the focus lens to the image pickup apparatus in the first communication, receive control information for the focus lens generated on the basis of the first information from the image pickup apparatus in the second communication following the first communication, and then receive control information for the stop generated on the basis of the first information from the image pickup apparatus in the next first communication.

11. The lens unit according to claim 10, wherein the lens control unit is configured to transmit the first information including information relating to a position of the stop and a position of the focus lens to the image pickup apparatus in the first communication.

12. The lens unit according to claim 10, wherein the lens control unit is configured to control a drive of the focus lens on the basis of the control information for the focus lens received from the image pickup apparatus in the second communication.

13. The lens unit according to claim 12,
wherein the lens control unit is configured to limit the drive of the focus lens on the basis of the control information for the focus lens received from the image pickup apparatus in the second communication in a case that a signal level of a predetermined data area in the second communication is a first level.

14. The lens unit according to claim 12,
wherein, in a case that a signal level of a predetermined data area in the second communication is a first level, the lens control unit is configured to control the focus lens on the basis of the control information for the focus lens received from the image pickup apparatus in the previous second communication.

15. The lens unit according to claim 14,
wherein in a case that the signal level of the predetermined data area in the second communication is a second level that is different from the first level, the lens control unit is configured to control the drive of the focus lens on the basis of the control information for the focus lens received from the image pickup apparatus in the second communication.

16. The lens unit according to claim 10,
wherein the lens control unit is configured to control a drive of the stop on the basis of the control information for the stop received from the image pickup apparatus in the first communication.

17. The lens unit according to claim 10,
wherein the first communication includes information relating to a position of the stop and a position of the focus lens.

18. The lens unit according to claim 10,
wherein a number of commands communicated in the first communication is larger than a number of commands communicated in the second communication.

19. A method of controlling an image pickup apparatus capable of detachably mounting a lens unit including a plurality of optical members that includes a stop and a focus lens, said method comprising the steps of:
accumulating charge in synchronization with a vertical synchronizing signal to generate an image signal;
receiving first information including information on the stop and the focus lens from the lens unit in first communication, wherein the first communication is performed in synchronization with the vertical synchronizing signal;
generating control information for each of the plurality of the stop and the focus lens of the mounted lens unit on the basis of the first information received in the first communication;
transmitting the control information for the focus lens to the lens unit in second communication, wherein the second communication is performed before the next first communication that is performed in synchronization with the next vertical synchronizing signal; and
transmitting the control information for the stop to the lens unit in the next first communication,
wherein each of the first communication and the second communication is packet communication for communicating predetermined information at a fixed-length.

20. A method of controlling a lens unit that includes a plurality of optical members including a stop and a focus lens, and is capable of being detachably mounted on an image pickup apparatus including an image pickup unit that accumulates charge in synchronization with a vertical synchronizing signal to generate an image signal, said method comprising the steps of:
transmitting first information including information on the stop and the focus lens to the image pickup apparatus in first communication, wherein the first communication is performed in synchronization with the vertical synchronizing signal received from the image pickup apparatus;
receiving control information for the focus lens generated on the basis of the first information from the image pickup apparatus in second communication, wherein the second communication is performed before the next first communication that is performed in synchronization with the next vertical synchronizing signal;
controlling a drive of the focus lens on the basis of the control information for the focus lens received from the image pickup apparatus;
receiving control information for the stop generated on the basis of the first information from the image pickup apparatus in the next first communication; and
controlling a drive of the stop on the basis of the control information for the stop received from the image pickup apparatus,
wherein each of the first communication and the second communication is packet communication for communicating predetermined information at a fixed-length.

21. An image pickup apparatus capable of detachably mounting a lens unit including a plurality of optical members that includes a focus lens, the image pickup apparatus comprising:
an image pickup unit configured to accumulate charge in synchronization with a vertical synchronizing signal to generate an image signal; and
a control unit configured to generate control information for each of the plurality of optical members of the mounted lens unit and configured to communicate the control information with the lens unit,
wherein the control unit is configured to perform first communication in synchronization with the vertical synchronizing signal, and to perform second communication before the next first communication that is performed in synchronization with the next vertical synchronizing signal,
wherein each of the first communication and the second communication is packet communication for communicating predetermined information at a fixed-length, and
wherein, in the first communication, the control unit is configured to transmit the control information for the optical member other than the focus lens to the lens unit, and in the second communication, the control unit is configured to transmit, along with the control information for the focus lens, information indicating whether the control information is valid to the lens unit.

22. A lens unit capable of being detachably mounted on an image pickup apparatus including an image pickup unit that accumulates a charge in synchronization with a vertical synchronizing signal to generate an image signal, the lens unit comprising:
a plurality of optical members including a focus lens; and
a lens control unit configured to communicate with an image pickup apparatus to which the lens unit is mounted and to control a drive of each of the plurality of optical members on the basis of information received from the image pickup apparatus,
wherein the lens control unit is configured to perform first communication in synchronization with the vertical synchronizing signal received from the image pickup apparatus, and to perform second communication before the next first communication that is performed in synchronization with the next vertical synchronizing signal, wherein each of the first communication and the second communication is packet communication for communicating predetermined information at a fixed-length, wherein the lens control unit is configured to control a drive of the focus lens on the basis of information received from the image pickup apparatus in the second communication, and to control a drive of the optical member other than the focus lens on the basis of information received from the image pickup apparatus in the first communication, and wherein the lens control unit is configured to limit the drive of the focus lens on the basis of the information received from the image pickup apparatus in the second communication in a case that a signal level of a predetermined data area in the second communication is a first level.

* * * * *